United States Patent [19]
Jacobson

[11] Patent Number: 5,943,655
[45] Date of Patent: Aug. 24, 1999

[54] CASH SETTLEMENT MACHINE

[75] Inventor: Douglas R. Jacobson, DesPlaines, Ill.

[73] Assignee: Cummins-Allison Corp., Mt. Prospect, Ill.

[21] Appl. No.: 08/467,585

[22] Filed: Jun. 6, 1995

[51] Int. Cl.$^6$ ................................................. G06F 17/60
[52] U.S. Cl. ........................... 705/30; 345/333; 345/335; 345/336; 345/354
[58] Field of Search ...................... 395/201, 230, 395/235, 239, 133, 167, 326, 329, 333, 335, 336, 338, 339, 348, 352, 354; 235/379, 380; 345/173, 178, 333, 335, 336, 354; 705/33–30, 35, 39

[56] References Cited

U.S. PATENT DOCUMENTS

| | | | |
|---|---|---|---|
| 4,524,268 | 6/1985 | Fukatsu | 235/379 |
| 4,623,964 | 11/1986 | Getz et al. | 395/201 |
| 4,682,288 | 7/1987 | Taipale et al. . | |
| 4,710,758 | 12/1987 | Mussler et al. | 345/178 |
| 4,782,328 | 11/1988 | Denlinger . | |
| 4,804,830 | 2/1989 | Miyagisima et al. . | |
| 4,806,709 | 2/1989 | Evans . | |
| 4,811,004 | 3/1989 | Person et al. . | |
| 4,851,616 | 7/1989 | Wales et al. . | |
| 4,926,368 | 5/1990 | Morita et al. | 364/715.05 |
| 4,928,094 | 5/1990 | Smith . | |
| 4,931,782 | 6/1990 | Jackson . | |
| 5,105,186 | 4/1992 | May . | |
| 5,182,705 | 1/1993 | Barr et al. | 705/4 |
| 5,183,142 | 2/1993 | Latchinian et al. . | |
| 5,184,115 | 2/1993 | Black et al. . | |
| 5,198,976 | 3/1993 | Form et al. . | |
| 5,231,381 | 7/1993 | Duwaer . | |
| 5,297,030 | 3/1994 | Vassigh et al. . | |
| 5,317,140 | 5/1994 | Dunthorn . | |
| 5,339,392 | 8/1994 | Risberg et al. | 395/333 |
| 5,474,393 | 12/1995 | Abbott et al. | 400/105 |
| 5,611,031 | 3/1997 | Hertzfeld et al. | 395/133 |

OTHER PUBLICATIONS

Dynapro Thin Film Products, Design Guide, Dynaclear–4® Analog Resistive and Matrix Touch Screens, Copyright 1993.

"Complete Cash Office Reconciliation System Now Available from Brandt", *News Release*; Sept. 29, 1991; Dialog: File 621,. Acc#00312733.

*Microsoft Press Computer Dictionary, 2nd ed.*; copyright 1994; p. 196.

EXE, v8, n8, Feb. 1994, Graham Anstey, "Reach out and touch," pp. 26–30 (pp. 22–30, attached).

InfoWorld, v. 15, n45, Nov. 8, 1993, Yvonne L. Lee, "Simon' PDA will emphasize communication", p. 6(pp. 31–32, attached).

Brandt, Model 4810, Brandt Cash Executive™/Cash Settlement Controller,; date: 1993.

Brandt, Settle on One–Brandt Model 4709 Cash Executive™ and Brandt Model 8700 Sett Mate™; date: believed to be prior to Jun., 1994.

Brandt, Model 817, Automated Coin and Currency Ordering System; date: 1983.

The Cash Room Is History; date: believed to be prior to Jun., 1994.

(List continued on next page.)

*Primary Examiner*—Stephen R. Tkacs
*Attorney, Agent, or Firm*—Arnold White & Durkee

[57] ABSTRACT

A cash settlement machine is disclosed comprising a graphics display, operator interface panels, and a controller coupling the operator interface panels to the graphics display. To provide the cash settlement machine with total flexibility in operation, the operator interface panels which provide input signals to the controller include a mechanical keyboard with fixed keys and a touch screen device mounted over the graphics display which shows display keys. The controller includes a graphics generator for displaying the display keys, memory for storing instructions associated with a plurality of operational modes accessed though the display keys, and means for executing those instructions. Preferably, the plurality of modes includes a basic operating mode, a help mode, a directory mode, a diagnostic mode, a reports mode, a screen format mode, and a set-up mode.

41 Claims, 28 Drawing Sheets

OTHER PUBLICATIONS

Brinks, SFB Solutions: Tomorrow's Processing Solutions Today; date: believed to be prior to Jun., 1994.

Mosler, Mosler Service: It's In Everything We Do; date: 1991.

Mosler, Currency Controller: The Cash Management System That Keeps Your Vault on the Leading Edge; date: 1992.

Magner Brooks Money Manager, Money Management Systems; date: believed to be prior to Jun., 1994.

Magner, Money Management Systems; date: believed to be prior to Jun., 1994.

Glory, CPS–9400 Cash Processing Solution; date: believed to be prior to Jun., 1994.

Glory, SR–700K: Cash Settlement System with Encoding Capability; date: believed to be prior to Jun., 1994.

Glory, SR–600 Cash Settlement System: Balancing and Reporting Made Easy; date: believed to be prior to Jun., 1994.

Glory, SR–600B: Cash Settlement System for Banks; date: believed to be prior to Jun., 1994.

Glory, VAS–100: Advanced Workstation Controller; date: believed to be prior to Jun., 1994.

Glory, Deposit Master II: High Speed Data Collection System; date believed to be prior to Jun., 1994.

Glory, Comp–U–Order: A High Speed Order Entry System; date: believed to be prior to Jun., 1994.

Glory, SR–430: Cash Settlement Mini–System; date: believed to be prior to Jun., 1994.

Cummins, Cash Information & Settlement Systems; date: believed to be prior to Jun., 1994.

Glory, SR–700 Series: Cash Settlement System; date: believed to be prior to Jun., 1994.

Glory, VAS–1000: Vault Automation System; date: believed to be prior to Jun., 1994.

Mosler, The Mosler CD–4000/CD–6000: There's A Better Way To Speed Up Teller–Assist Cash Dispensing; date: 1989.-

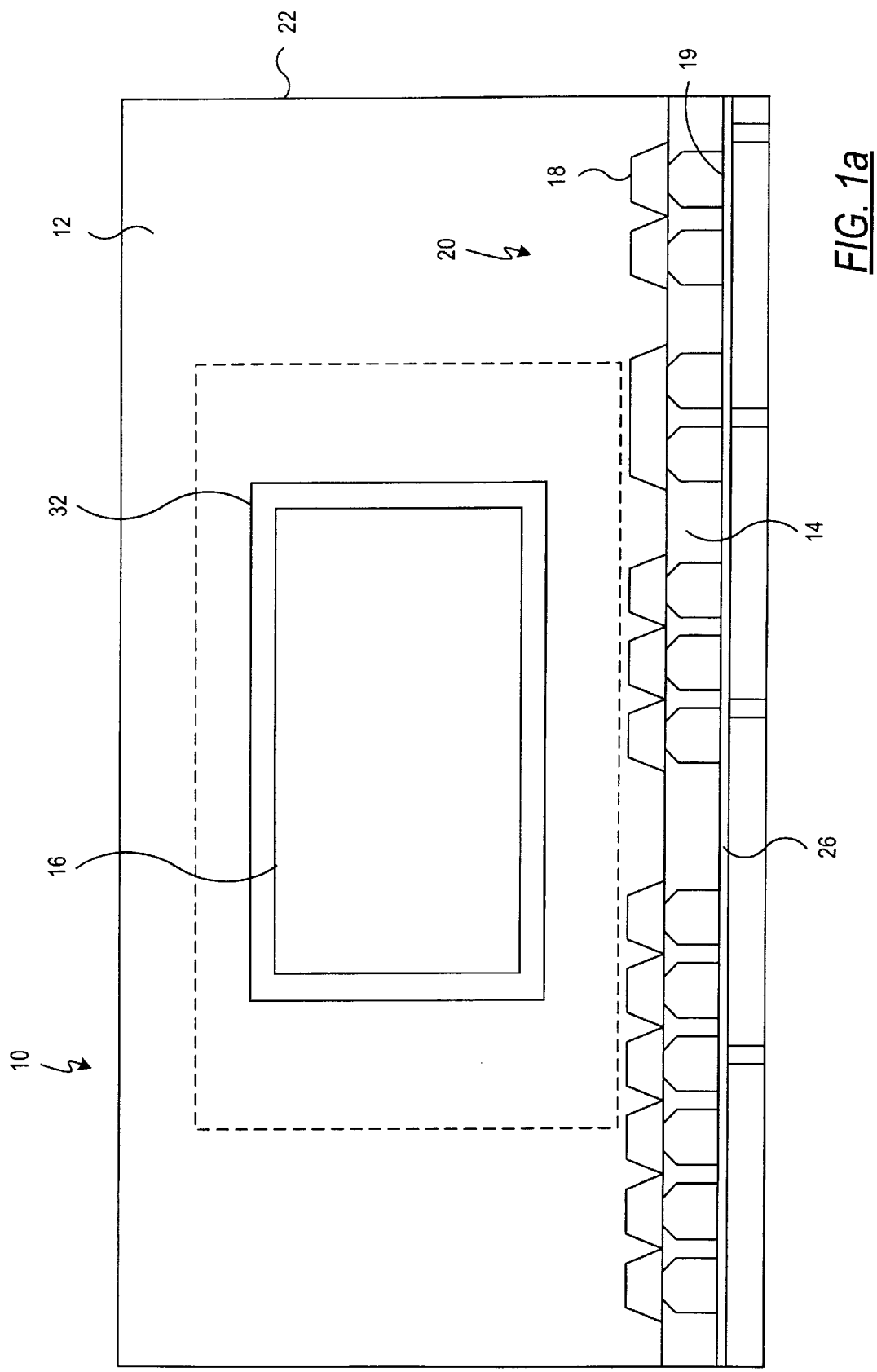

YOU ARE EDITING THE (DESCRIPTION OR EXAMPLE) OF _____ KEY.
THE CURRENT (DESCRIPTION OR EXAMPLE) IS AS FOLLOWS:
THE PURPOSE OF THE _____ KEY IS TO.....
| CURSOR  | CURSOR  | INSERT | TYPEOVER | BACKSPACE | FINISHED EDIT |
*FIG. 7*
ENTER CHARACTERS: THE PURPOSE OF THE _____ KEY...
| a | b | c | d | e | f |
| g | h | i | j | k | l |
| m | n | o | p | q | r |
| s | t | u | v | w | x |
| y | z | SPACE | SYMBOL | SHIFT | RETURN |
*FIG. 8a*

THE FOLLOWING LIST OF REGISTERS CONTAINED THE NUMERICAL SEQUENCE "241" IN THEIR ID HEADER

| REGISTER | | | |
|---|---|---|---|
| 21 | TELLER: #241 | APRIL 16, 1995 | LANE 13 |
| 39 | TELLER: #241 | APRIL 17, 1995 | LANE 17 |
| 314 | CHECKER #1241 | FEB. 21, 1994 | SERVICE EXPRESS |
| 315 | CHECKER #1241 | FEB. 22, 1994 | SERVICE EXPRESS |
| 497 | CHECKER #1241 | FEB. 28, 1994 | SERVICE EXPRESS |
| 561 | TELLER: #241 | FEB. 27, 1994 | LANE 14 |
| 562 | TELLER: #241 | MARCH 3, 1994 | LANE 19 |
| 739 | BILL JOHNSON | 241-62-3267 | DEPOSIT TO BANK |
| 840 | BILL JOHNSON | 241-62-3267 | DEPOSIT TO BANK |
| 841 | TELLER: #241 | APRIL 2, 1995 | LANE 14 |

| NEW SEARCH OR END | CURSOR ▲ | CURSOR ▼ | NEXT 10 REGISTERS | PREVIOUS 10 REGISTERS | VIEW ENTIRE REGISTER |

REGISTER # 562
JOEY'S GROCERY STORE
8000 N. GOMEZ RD
CHICAGO, IL
600 12-5463
TELLER: #241, MARCH 3, 1994, LANE 19

| | VALUE | UNITS | DENOMINATION |
|---|---|---|---|
| CURRENCY: | $500.00 | 500 | 1 |
| | $100.00 | 20 | 5 |
| | $500.00 | 50 | 10 |
| TOTAL CURRENCY: | $1100.00 | | |
| COIN: | $10.00 | 1000 | .01 |
| | $50.00 | 1000 | .05 |
| | $500.00 | 2000 | .25 |
| TOTAL COIN: | $560.00 | | |
| FOOD STAMPS: | $500.00 | | |
| COUPONS: | $200.00 | | |
| TOTAL: | $ 2360.00 | | |

NEW SEARCH OR END SEARCH

RETURN TO REGISTER LIST

ENTER THE WORD(S) YOU WOULD LIKE SEARCHED IN
THE MEMORY REGISTER: "TELLER"

| A | B | C | D | E | F |
| G | H | I | J | K | L |
| M | N | O | P | Q | R |
| S | T | U | V | W | X |
| Y | Z | SPACE | | | EXIT SEARCH |

*FIG. 12*

THE FOLLOWING LIST OF REGISTERS CONTAIN THE WORD
"TELLER" IN THEIR ID HEADER

| REGISTER | ID HEADER | | |
|---|---|---|---|
| 21 | TELLER: #241 | APRIL 16, 1995 | LANE 13 |
| 39 | TELLER: #241 | APRIL 17, 1995 | LANE 17 |
| 314 | TELLER: #617 | FEB. 21, 1994 | SERVICE EXPRESS |
| 315 | TELLER: #312 | FEB. 22, 1994 | SERVICE EXPRESS |
| 497 | TELLER: #391 | FEB. 28, 1994 | SERVICE EXPRESS |
| 561 | TELLER: #241 | FEB. 27, 1994 | LANE 14 |
| 562 | TELLER: #241 | MARCH 3, 1994 | LANE 19 |
| 739 | TELLER: #391 | 241-62-3267 | DEPOSIT TO BANK |
| 840 | TELLER: #312 | 241-62-3267 | DEPOSIT TO BANK |
| 841 | TELLER: #241 | APRIL 2, 1995 | LANE 14 |

| NEW SEARCH OR END | CURSOR ↓ | CURSOR ↑ | NEXT 10 REGISTER | PREVIOUS 10 REGISTER | VIEW ENTIRE REGISTER |

*FIG. 13*

| PORT STATUS: | | | | |
|---|---|---|---|---|
| PORT | PERIPHERAL | BAUD | DATA | PARITY |
| 1 | PRINTER | 9600 | 8 BIT | NONE |
| 2 | JET SCANNER | 9600 | 8 BIT | EVEN |
| 3 | JET SORTER | 4800 | 8 BIT | ODD |
| 4 | OFF | | | |
| 5 | OFF | | | |
| 6 | BAR CODE WARD | 4800 | 7 BIT | ODD |
| 7 | COIN DISPENSER | 9600 | 8 BIT | EVEN |
| 8 | CURRENCY DISPENSER | 9600 | 7 BIT | ODD |

TEST PORT

EXIT DIAGNOSTICS MODE

| BASIC PRINT | FORMAT #2 | DENOMINATION | NUMBER | |
|---|---|---|---|---|
| 0123456789012345 | 67890123456 | 78901234567 | 890123456789012 | |
| L1 | | | | |
| L2 | | | | REMOVE LINE |
| L3 | CASH | T1 | D1 | NT |
| L4 | | T2 | D2 | N2 | ADD LINE |
| L5 | | T3 | D3 | N3 |
| L6 | | T4 | D4 | N4 | REMOVE SPACE |
| L7 | TOTAL CASH | T5 | | |
| L8 | COIN | CT1 | CD1 | CN1 | ADD SPACE |
| L9 | | CT2 | CD2 | CN2 |
| L10 | | CT3 | CD3 | CN3 | SCROLL UP |
| L11 | | CT4 | CD4 | CN4 |

SCROLL DOWN

EXIT FORMATS

PORT 1 SETUP

| FUNCTION: | OFF | PRINTER | COMM | JTSRT | WAND |
| --- | --- | --- | --- | --- | --- |
| | JTSCN | JTCNT | ENCDR | CURDSP | CNDSP |
| BAUD: | 600 | 1200 | 2400 | 4800 | 9600 |
| DATA: | 7 | 8 | | NEXT | BACK |
| PARITY: | ODD | EVEN | NONE | | EXIT |

| 1 C $1 | 5 C $5 |
|---|---|
| 10 C $10 | 25 C $20 |
| 50 C $50 | 5BA $100 |
| T1 $2 | T2 |
| FOREIGN CURRENCY | |

| HELP | F1 COUPONS | F2 CHECKS | DIAGNOSTICS | F3 CREDIT CARD | F4 ATM CARD | DIRECTORY | F5 DISABLED | F6 DISABLED | REPORTS | SCREEN FORMAT | | SET-UP | |
|---|---|---|---|---|---|---|---|---|---|---|---|---|---|
| | COIN | CURR | | DATE | SUB TOTAL | | TOTAL | GRAND TOTAL | SESSION | CLEAR | 7 | 8 | 9 |
| | ROLLED COIN | STRAP CURR | | LABEL | DECLR BAL. | | PSS PBB | ID | VERIFY | ACCEPT | 4 | 5 | 6 |
| | | | | | | | | | ENTER | | 1 | 2 | 3 |
| | | | | | | | | | | | 0 | 00 | - |

CASH SETTLEMENT MACHINE

FIELD OF THE INVENTION

The present invention relates generally to a cash settlement machine for recording and reconciling monetary transactions.

BACKGROUND OF THE INVENTION

Cash settlement machines are used to gather and record data relating to monetary transactions. Generally, the operator of the cash settlement machine is a supervisor who is interested in the value of transactions performed by subordinates interacting with consumers at a transaction station. The cash settlement machine records various financial data such as cash, coins, credit card receipts, coupons and other related data from each station. The data can be input into the cash settlement machine manually or automatically via numerous peripheral machines communicating with the cash settlement machine such as coin sorters, cash scanners and counters, and bar code readers. The operator reviews the financial data which the cash settlement machine has recorded and reconciles it with the amount declared by the subordinate.

The cash settlement machine also permits the operator to manipulate the data. For example, daily totals for each station or all stations can be established. The total of only coins from one station can be displayed. And, numerous other functions similar to these illustrative examples can be executed. Functions directed to the unique requirements of an operator or an industry can also be utilized.

In existing cash settlement machines, the operator interface panel for operator interaction with the cash settlement machine is a conventional mechanical keyboard with depressible keys. The keys are used to enter data or to instruct the cash settlement machine to perform a function such as data manipulation or communication with a peripheral device. A graphics display monitor adjacent the mechanical keyboard displays the status of the cash settlement machine. Considering the numerous industries which rely upon a multitude of monetary transactions each day, versatility of the means in which financial data is input, as well as the manner in which the data is displayed on the monitor is essential.

Many basic cash settlement machines employing a key-limited keyboard and having fewer functions exist on the market. Additionally, several advanced cash settlement devices exist on the market today. Most of these advanced cash settlement devices employ a personal computer dedicated solely to cash settlement software and include an expanded keyboard. As would be expected, these advanced cash settlement devices have more capabilities but are much more expensive in comparison with the basic cash settlement devices.

One drawback of the basic cash settlement machine is that the configuration of the displayed data on the graphics display is limited and may not suit the unique needs of an operator or an industry. Another major disadvantage of the basic cash settlement machine is that the mechanical keyboard is relatively unfriendly to the operator. The mechanical keyboard provides only a limited flexibility in operation, diagnostics, and programming. The amount of keys are so limited that the keys must have secondary functions to accomplish the objectives of the machine. However, when secondary key functions are introduced to a keyboard, operator confusion increases. And even with secondary key functions, the operator still has a limited capability to customize the identification of cash machine functions and data entry fields due to the restricted amount of characters. The keyboard could be expanded to include more functions and characters as done with many expensive, advanced cash settlement machines. But, this alternative increases the desk space required for the keyboard as well as the cost. Another alternative to enhance the amount of characters available to the operator for programming is to display an expanded selection of characters on the monitor and allow the operator to use arrow keys to select the desired character from the display. However, this process is very time consuming, especially when multiple character descriptions are needed.

From the perspective of a manufacturer, the operator interface panel is disadvantageous because modifications to the operator interface panel involve hardware changes. Any updates to the machine would likely require a modification of the production line which is costly and time-consuming. Also, the correction of a design error requires similar expensive and lengthy modifications. Furthermore, the additional cost to customize the operator interface panel to meet the unique needs of a potential consumer may drive that consumer away. And, the manufacturer has a limited ability for diagnostics due to the limited amount of keys.

SUMMARY OF THE INVENTION

In one particular embodiment of the present invention, a cash settlement machine comprises (1) a display monitor, (2) operator interface panels, and (3) a controller coupling the operator interface panels to the display monitor. To provide the cash settlement machine with total flexibility in the operational mode as well as other functional modes, the operator interface panel includes a mechanical keyboard and a touch screen device. The controller causes the graphics display to display keys and operably couples a touch screen mounted over the display to those displayed keys. Operator actuation of the touch screen at a position over one of the displayed keys causes the controller to perform the function associated with that displayed key. Thus, the controller receives operator inputs from the mechanical keyboard and the touch screen device.

Preferably, the controller is operable via the touch screen in a plurality of modes supplementing the basic operating mode. These supplemental modes include a help mode, a diagnostic mode, a directory mode, a reports mode, a screen format mode, and a set-up mode. The controller causes the display to display keys associated with these modes during the operational mode such that an operator may access these modes easily by actuation of the touch screen over those display keys. Thus, the cash settlement machine utilizing the touch screen enhances the capability of the basic cash settlement station without modifying the existing mechanical keyboard.

In an alternative embodiment, the touch screen located over the display monitor is the entire operator interface panel. Thus, the mechanical keyboard is completely eliminated in this embodiment. Again, the controller operably couples the touch screen to the displayed keys such that actuation of the touch screen at a position over one of the displayed keys causes the controller to perform a function associated with that displayed key. In this embodiment, the touch screen and display have an expanded role over the previous embodiment by providing all operator inputs for the cash settlement machine. This embodiment can be quite advantageous in workplaces with spacial constraints. Additionally, this embodiment works well in an environment where numerous types of monetary media are transacted such as in an international currency exchange, or a casino.

BRIEF DESCRIPTION OF THE DRAWINGS

Other objects and advantages of the invention will become apparent upon reading the following detailed description and upon reference to the drawings in which:

FIG. 1a is a front view of a cash settlement machine with a touch screen device;

FIG. 7 is an illustration of the graphics display in the HELP mode directing the operator to edit the help mode information or example;

FIG. 8a is an illustration of the graphics display in the HELP mode wherein lower case alpha characters display keys are activated;

FIG. 8b is an illustration of the graphics display in the HELP mode wherein upper case alpha characters display keys are activated;

FIG. 8c is an illustration of the graphics display in the HELP mode wherein symbol characters display keys are activated;

FIG. 10 is an illustration of the graphics display in the DIRECTORY mode wherein the output of a numerical sequence search is shown;

FIG. 11 is an illustration of the graphics display in the DIRECTORY mode wherein detailed register information is shown;

FIG. 12 is an illustration of the graphics display in the DIRECTORY mode wherein the operator enters a word to be searched in the register;

FIG. 13 is an illustration of the graphics display in the DIRECTORY mode wherein the output of a word search is shown;

FIG. 15 is an illustration of the port communication status in the DIAGNOSTICS mode;

FIG. 19 is an illustration of the graphics display wherein the operator is modifying the print format in the REPORTS mode;

FIG. 21 is an illustration of the graphics display wherein the operator is initializing a port in the SET-UP mode; and FIG. 22 is an illustration of the graphics display wherein the touch screen device includes all the display keys from the mechanical keyboard.

Figure 1B:
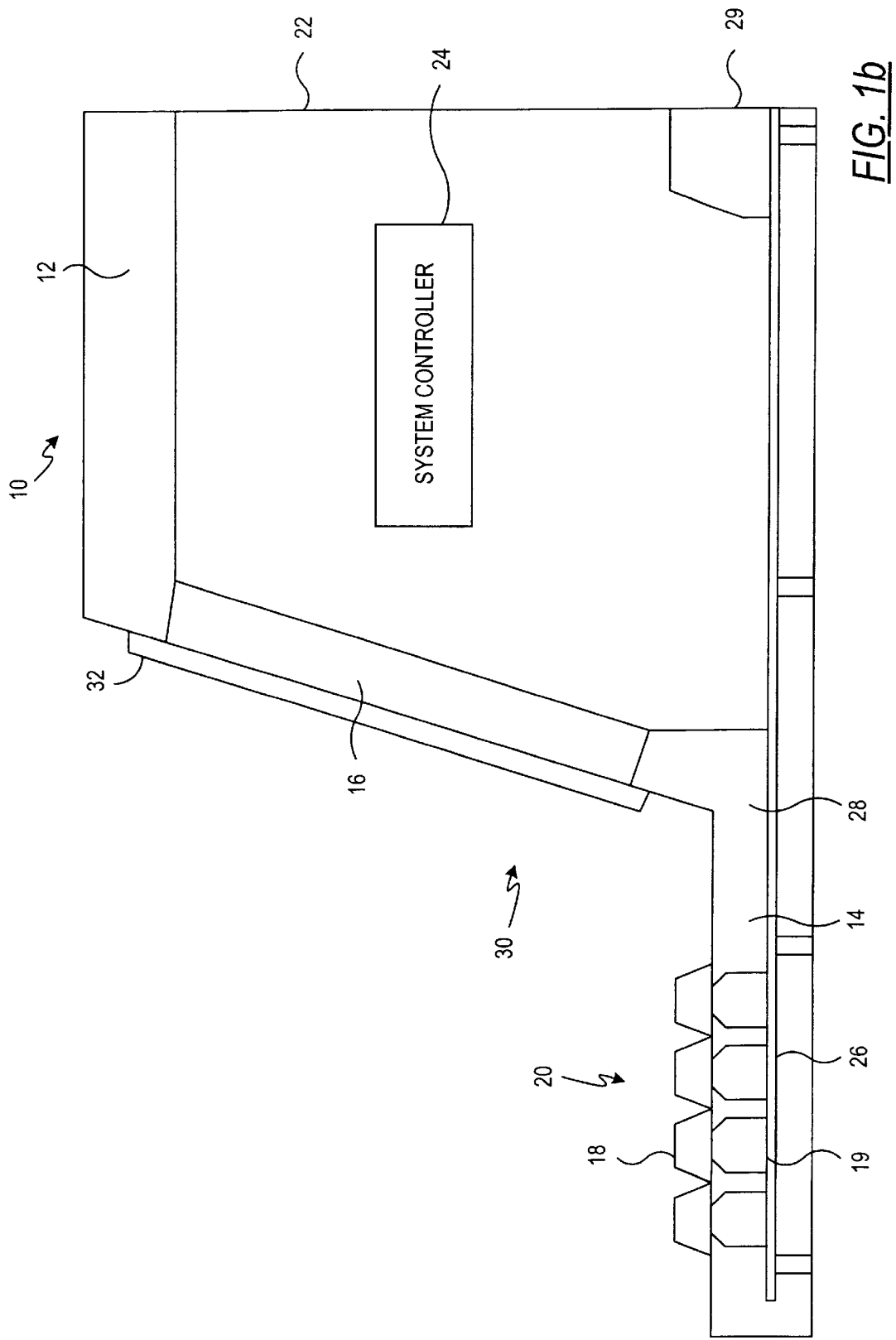
FIG. 1b is a profile view of a cash settlement machine with a touch screen device.

While the invention is susceptible to various modifications and alternative forms, certain specific embodiments thereof have been shown by way of example in the drawings and will be described in detail. It should be understood, however, that the intention is not to limit the invention to the particular forms described. On the contrary, the intention is to cover all modifications, equivalents, and alternatives falling within the spirit and scope of the invention as defined by the appended claims.

DESCRIPTION OF THE PREFERRED EMBODIMENT

FIGS. 1a and 1b illustrate a typical cash settlement machine (CSM) 10. The CSM 10 includes a monitor portion 12 and a keyboard portion 14 which are generally integral at the base of the monitor portion 12. The monitor portion 12 contains a graphics display 16 which is located above and adjacent the keyboard portion 14. The keyboard portion 14 contains a plurality of keys 18 comprising a mechanical keyboard 20. Generally, the monitor portion 12 and the keyboard portion 14 are encased in a common housing 22 except over the mechanical keyboard 20 and the graphics display 16.

Referring specifically to FIG. 1b, the monitor portion 12 contains a system controller 24 which operably couples the mechanical keyboard 20 to the graphics display 16. Generally, the controller 24 is a microprocessor. As the operator depresses one of the keys 18, a key base 19 contacts a keypad 26. Typically, the keypad 26 sends a signal to the system controller 24 via a signal path 28 corresponding to the depressed key 18. Depending on which key the operator depresses, the system controller 24 then alters the data displayed on the graphics display 16 or performs a function associated with the depressed key 18. The monitor portion 12 also contains a region for communication ports 29 to which peripheral devices are connected for interaction with the controller 24. Generally, these ports will be RS232 communication ports. In addition to the mechanical keyboard 20, the operator interacts with the system controller 24 through a touch screen I/O device 30 which includes a touch screen 32 mounted over the graphics display 16 for sending signals to the controller 24.

Figure 2:
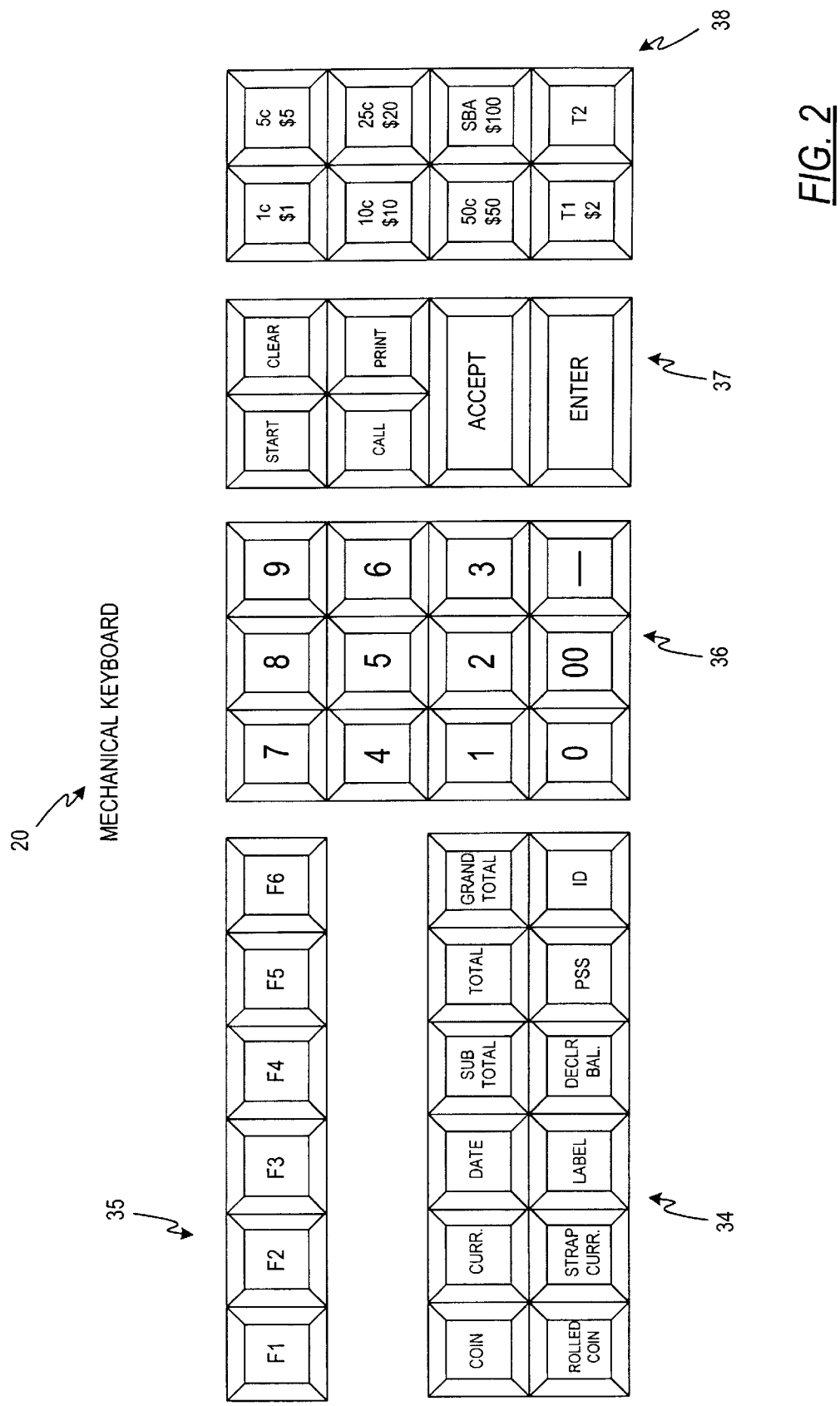
FIG. 2 is an illustration of the mechanical keyboard in a typical cash settlement machine.

Referring now to FIG. 2, a typical mechanical keyboard 20 is illustrated with five key groupings. A basic functional group 34 includes function keys, such as totalling functions, and monetary media keys, such as the coin key, which most industries utilizing a CSM 10 require. A variable function group 35 is illustrated as keys labeled F1–F6. The operator has the capability of defining these variable functions such that the keyboard can be customized to suit the specific needs of that operator. A numerical group 36 is also included. A process group 37 allows the operator to start sessions, input data, print data, and verify functions. Finally, a monetary group 38 allows the operator to manually enter the amount of various coins or currency. These key groupings represent the most commonly used functions and are ergonomically positioned to permit easy interaction with the CSM 10.

Figure 3:
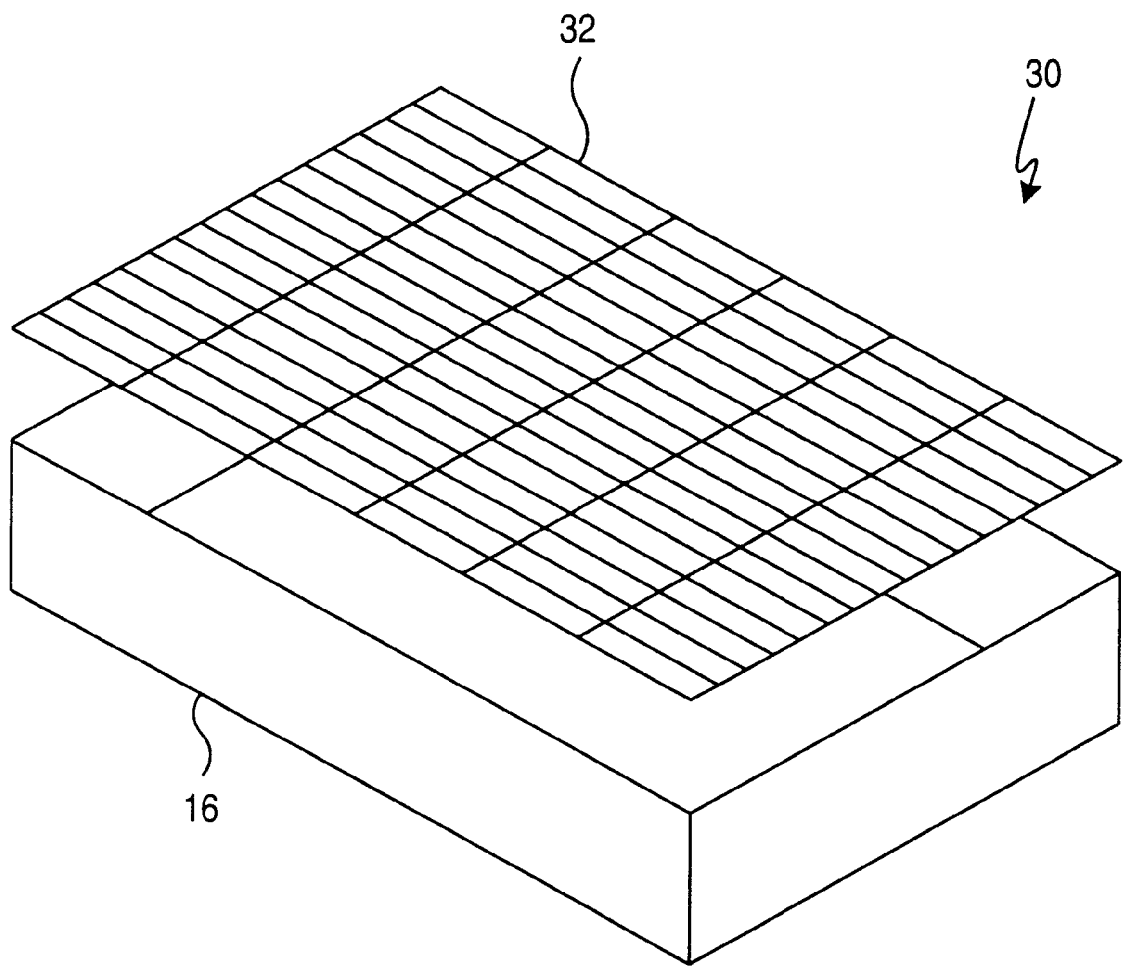
FIG. 3 is a perspective view of the touch screen device.

Referring now to FIG. 3, the touch screen I/O device 30 is illustrated to show its matrix structure and positioning over the graphics display 16. In one embodiment, the display 16 is a liquid crystal display (LCD) with 128 vertical pixels and 256 horizontal pixels that utilizes backlighting. The display 16 contains a built-in character generator which permits the display 16 to display text and numbers having a font and size pre-defined by the display manufacturer.

Moreover, the controller 24 is programmed to permit the loading and display of custom fonts and shapes (e.g., key outlines) on the display 16. The display 16 is commercially available from Stanley Electric Company, Ltd., Equipment Export Section, of Tokyo, Japan.

In one embodiment, the touch screen 32 is an X-Y matrix touch screen forming a matrix of touch responsive points. The touch screen 32 includes two closely spaced, but normally separated layers of optical grade polyester film each having a set of parallel transparent conductors. The sets of conductors in the two spaced polyester sheets are oriented at right angles to each other so when superimposed they form a grid. Along the outside edge of each polyester layer is a bus which interconnects the conductors supported on that layer. In this manner, electrical signals from the conductors are transmitted to the controller 24. When pressure from a finger or stylus is applied to the upper polyester layer, the set of conductors mounted to the upper layer is deflected downward into contact with the set of conductors mounted to the lower polyester layer. The contact between these sets of conductors acts as a mechanical closure of a switch element to complete an electrical circuit. The controller 24 detects the closure through the respective buses at the edges of the two polyester layers thereby providing a means for detecting the X and Y coordinates of the switch closure. A matrix touch screen 32 of the above type is commercially available from Dynapro Thin Film Products, Inc. of Milwaukee, Wis. As illustrated in FIG. 3, the touch screen 32 forms a matrix of optically transparent switches having X columns and Y rows. If desired, the controller 24 may be programmed to combine one or more adjacent switch elements into a single switch, such that activation of any of the combined switch elements activates the function associated with that switch.

Although the touch screen 32 uses an X-Y matrix of optically transparent switches to detect the location of a touch, alternative types of touch screens may be substituted for the touch screen 32. These alternative touch screens use such well-known techniques as crossed beams of infrared light, acoustic surface waves, capacitance sensing, and resistive membranes to detect the location of a touch. The structure and operation of the alternative touch screens are described and illustrated, for example, in U.S. Pat. Nos. 5,317,140; 5,297,030; 5,231,381; 5,198,976; 5,184,115; 5,105,186; 4,931,782; 4,928,094; 4,851,616; 4,811,004; 4,806,709; and 4,782,328, which are incorporated herein by reference.

The controller 24 is programmed to display various sets of "keys" on the display 16. A key is preferably displayed on the display 16 in the form of either an asterisk "*" or key outline. If the key is displayed as an asterisk "*", a key legend defining the function of the key is positioned adjacent the asterisk "*" on the display 16. If the key is displayed as an outline (e.g., rectangle, circle, or other shape), the key legend is positioned either within the key outline or adjacent the key outline. Each legend designates the function of its associated key. The controller 24 links the function of each touch screen switch to the key displayed beneath the respective one of the switches. As a result, pressing the touch screen 32 at a location above a displayed key sends a signal to the controller 24 to perform the function associated with the received signal. Hereinafter, references to pressing a "display key" denote that an operator is pressing the touch screen 32 at a location above the displayed key, while references to pressing a "fixed key" denote the operator is pressing a key on the mechanical keyboard 20. Moreover, a title of a particular display key appears in uppercase letters.

Figure 4:
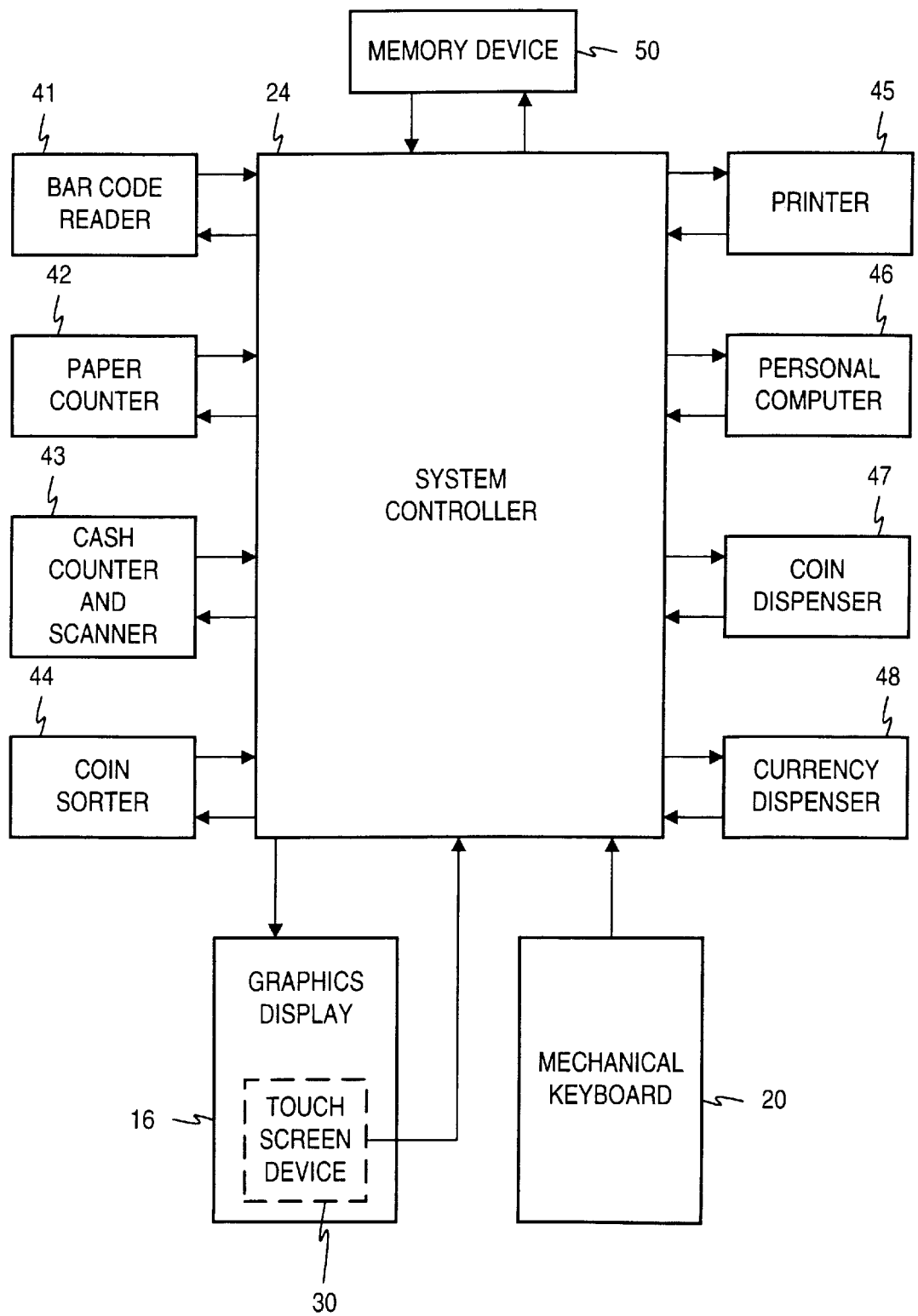
FIG. 4 is a block diagram illustration of the cash settlement machine with a touch screen device.

FIG. 4 is a block diagram illustration of the interaction between elements of the CSM 10. The system controller 24 receives signals from a mechanical keyboard 20 and the touch screen device 30. In response to the signal inputs received from the touch screen device 30 and the mechanical keyboard 20, the controller 24 performs a variety of functions. First, the controller 24 alters the output on the graphics display 16 to be viewed by the operator. Alternatively, the controller 24 instructs one of the peripheral devices to perform a function, or accepts information from a peripheral device. Additionally, the controller 24 may record data to or retrieve data from a memory device 50. The memory device 50 contains numerous registers for storing blocks of information. Generally, each register is associated with a cash settlement transaction or a worker and is labeled accordingly by the operator. The memory device 50 can be external or internal to the CSM 10, but generally it is internal. The memory device 50 contains the software which the controller 24 runs to perform the desired functions associated with the display keys of the touch screen 30 and the fixed keys 18. Once a signal from these keys is received by the controller 24, the software instructions associated with the received signal are executed and the desired function is performed by the controller 24.

As shown in FIG. 4, the peripheral devices include a bar code reader 41, a paper counter 42, a cash counter and scanner 43, a coin sorter 44, a printer 45, a personal computer 46, a coin dispenser 47, and a currency dispenser 48. The bar code reader 41 is useful in scanning various types of monetary media such as coupons or scanning a worker ID card. A Hewlitt-Packard bar code wand model 8400 is an example of many bar code readers that could be utilized. The paper counter 42 is useful when counting a multitude of paper cash of the same denomination. JET-COUNT models 4050, 4051, 4070, and 4071 paper counters from Cummins-Allison, Corporation of Mt. Prospect, Ill. are examples which can be utilized. A JETSCAN model 4061 and 4062 cash scanner from Cummins-Allison, Corporation could be used as the cash counter and scanner 43 which is useful in counting and denominating large quantities of paper currency of multiple denominations. Numerous JET-SORT model series from Cummins-Allison, Corporation could be utilized as the coin sorter 44 which is useful when large amounts of coins are being recorded and reconciled.

Numerous common printers can be used. For example, the printer 45 could be a Citizen printer model 562 or 3530 made by Citizen/CBM America Corp. of Santa Monica, Calif. Various types of personal computers 46 can be connected to the CSM 10, including computers linked directly into an accounting system. The Technitrol ACD-6 currency dispenser made by Technitrol Inc., Philadelphia, Pa., could be utilized in addition to the Diebold "Express Delivery" family of products from Diebold, Inc. of Canton, Ohio. The currency dispenser 48 is useful when transactions are being recorded which result in the retransfer of money back to the person from whom money was received for recordation. It is also useful when foreign currency is being exchanged. The coin dispenser 47 could be a Telequip model "Transact" from Telequip Corp. of Hollis, N.H., or other types of dispensers. Like the currency dispenser, this peripheral is useful when money is retransferred. These peripheral devices are only examples of the types of peripheral devices which can be utilized. Other peripherals suitable to the needs of the specific operator could easily be incorporated into the overall system design as well.

Due to the touch screen device 30, the operator can access various modes of operation which the operator would be incapable of accessing in a basic cash settlement device. The touch screen device 30 enhances the versatility of the basic cash settlement device by providing access to these modes in the basic operational mode without expanding the mechanical keyboard 20. Each mode includes various functions which provide the operator with numerous options which are accessed by merely depressing a displayed key on the touch screen 32. Preferably, the modes always accessible by the operator include a help mode, a diagnostics mode, a directory mode, a reports mode, a screen format mode and a set-up mode. Each of these modes is described in detail below.

Figure 5:
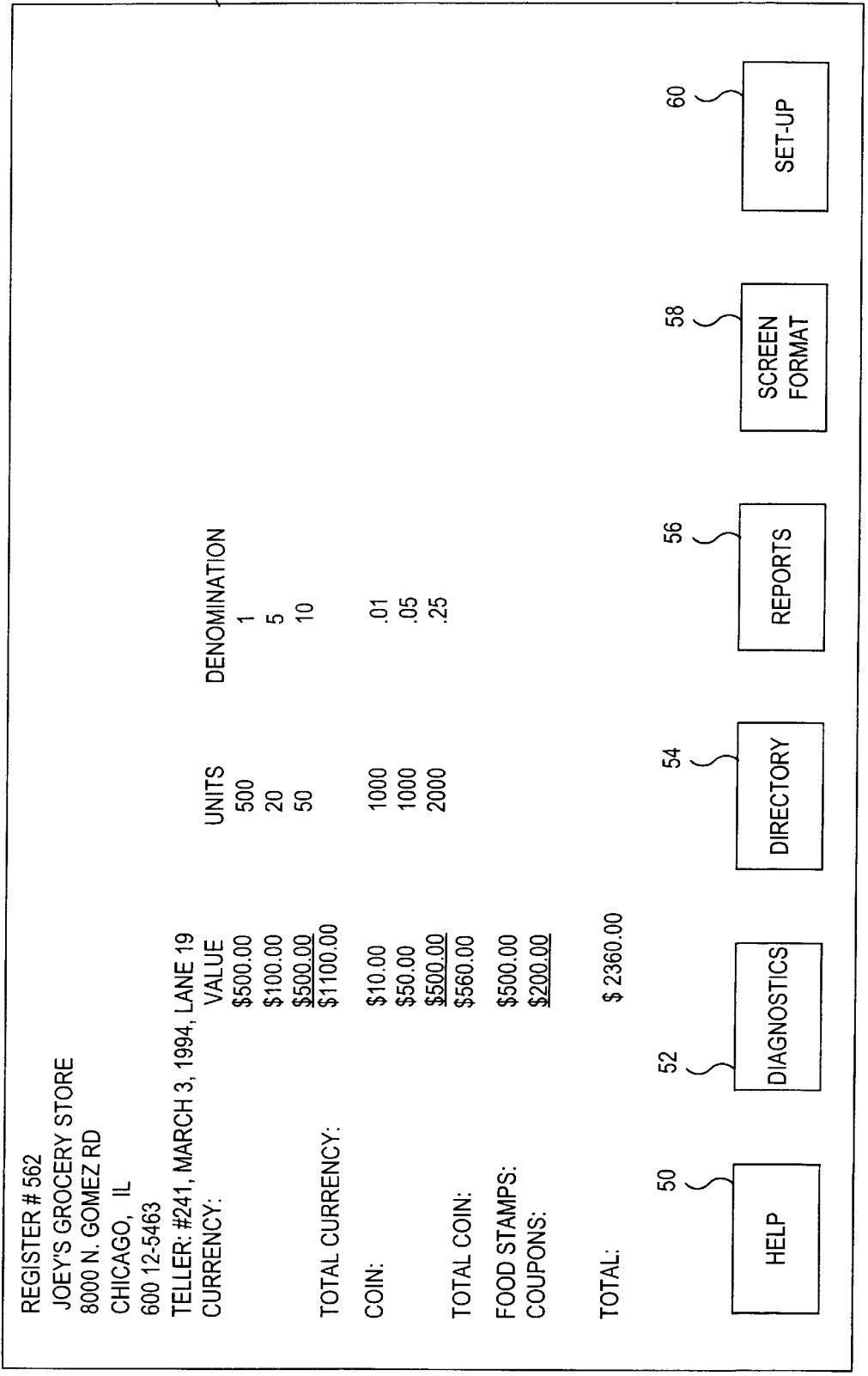
FIG. 5 is an illustration of the graphics display in the basic operating mode with the supplemental mode display keys.

FIG. 5 illustrates the display 16 in normal operation. On the bottom portion of the display 16, six modes are shown as mode display keys which can be accessed by pressing the touch screen 32 superimposed over the graphics display 16. When one of these mode display keys is actuated, the graphics display 16 changes into a menu screen associated with that mode. Alternatively, the graphics display 16 can simply have only one mode display key which when actuated by the operator causes the graphics display 16 to display all available modes. This alternative would preserve the space available on the graphics display 16 in the basic operating mode.

A HELP display key 50 allows the operator to access a help mode when the operator is uncertain as to the meaning or function of a fixed key 18 on the mechanical keyboard 20. The help mode not only describes the function of the fixed key 18, but also includes examples utilizing the fixed key 18 of which the operator is uncertain to further teach the operator. Additionally, the help mode includes an editing session which permits customization of the help mode information. A DIAGNOSTICS display key 52 allows the operator to access a diagnostics mode which checks the status of the touch screen 32 and the communication links to the peripheral devices via the ports 29. A DIRECTORY display key 54 allows the operator to access a directory mode wherein the operator can search the headers of all memory registers. This search can be accomplished by using operator-entered words or numerals. A REPORTS display key 56 allows the operator to enter a reports mode. The operator selects reports which are to be sent to a printer peripheral device or downloaded to a personal computer. The reports mode also allows the operator to select the format of the report. A SCREEN FORMAT display key 58 allows the operator to access a screen format mode which is used to vary the manner in which characters and data are displayed on the graphics display 16. Finally, a SET-UP display key 60 allows the operator to access a set-up mode. The operator utilizes the set-up mode to configure the database registers, determine the ports 29 to which the peripheral devices communicate, label fixed keys 18 from the variable function group 35 on the mechanical keyboard 20, and enable or disable fixed key 18 or display keys. Each of these modes is described in detail in the following paragraphs.

Figure 6A:
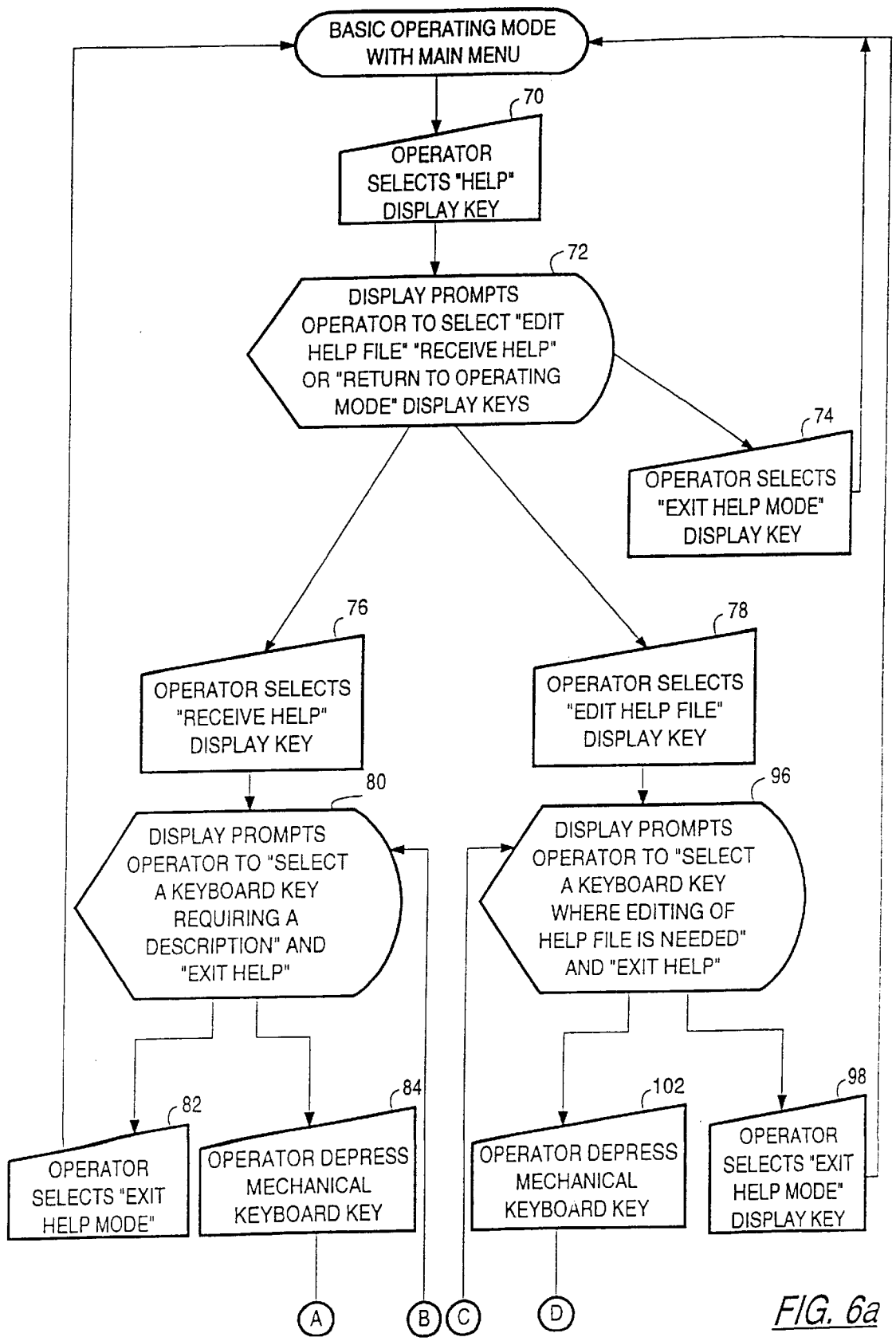
FIGS. 6a and 6b illustrate the flow diagram of the HELP mode.
Figure 6B:
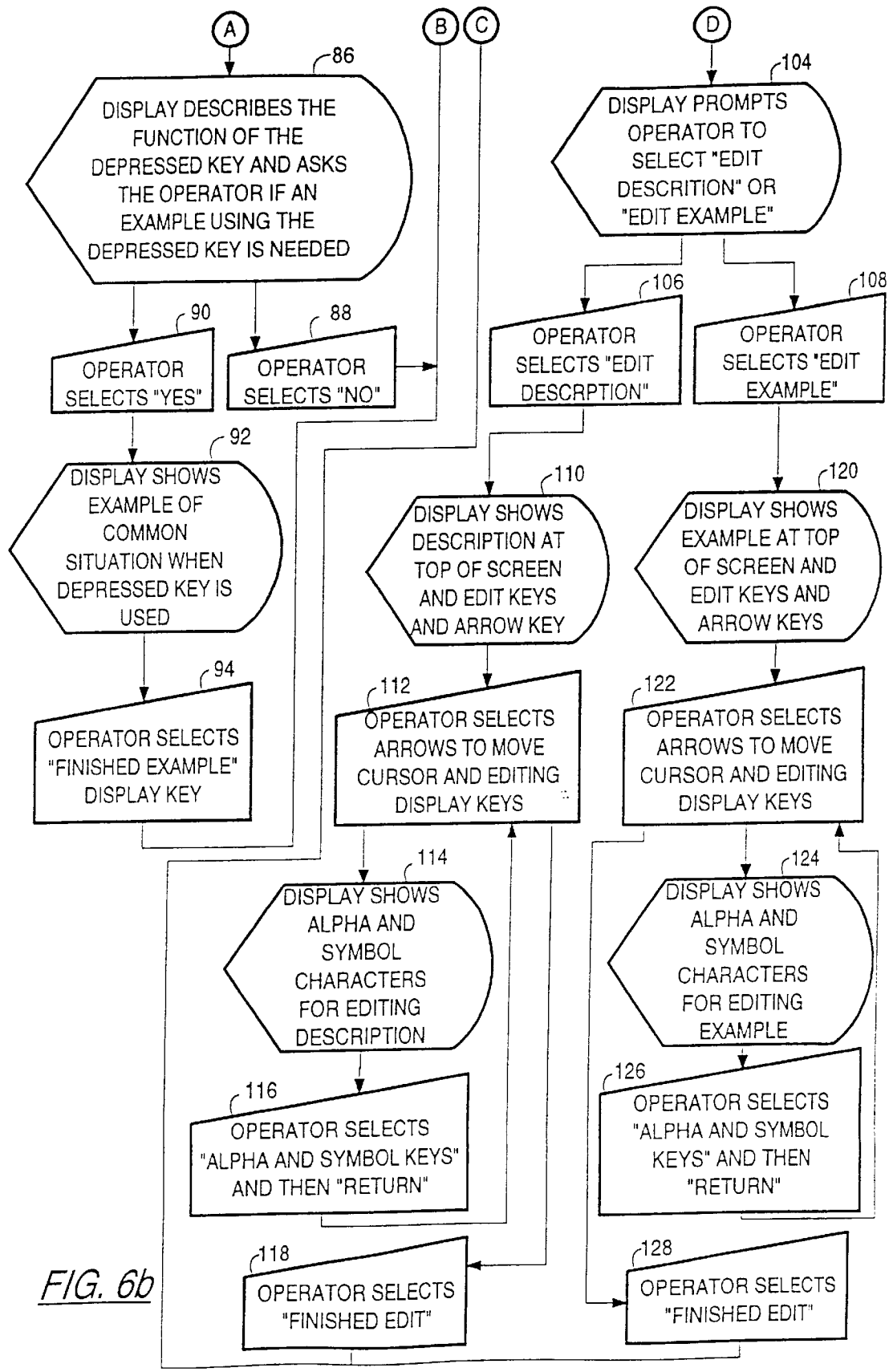

In response to actuating the HELP display key 50 on FIG. 5 (step 70), the flow diagram logic of FIGS. 6a and 6b is then followed. The display 16 then changes to the help mode prompting the operator to select an option using displayed keys (step 72). The operator may simply decide to return to the operating mode (step 74) by selecting the EXIT HELP MODE display key. Alternatively, the operator may decide to receive help (step 76) or to edit the help file (step 78) by selecting the RECEIVE HELP or EDIT HELP FILE display keys respectively.

If the operator chooses to receive help (step 76), the graphics display 16 then prompts the operator to select a fixed key 18 from the mechanical keyboard 20 on which the operator requires assistance or to exit the help mode (step 80). The operator may again select the EXIT HELP MODE display key (step 82) and return to the screen in the basic operating mode the operator was previously viewing. However, if the operator selects a fixed key 18 from the mechanical keyboard 20 (step 84), then the graphics display 16 describes the depressed fixed key and indicates how it is used in operating the CSM 10 (step 86). Additionally, the display 16 asks the operator if an example is needed. If the operator selects in the negative to the prompting for an example (step 88), then the display 16 returns to step 80 to allow the operator to receive assistance on additional fixed keys 18.

If the operator chooses to receive an example (step 90), then the display 16 gives an example which uses the fixed key 18 (step 92). If the example is lengthy and requires more than one screen, the operator can hit a NEXT PAGE or a PREVIOUS PAGE display key to view the entire text of the example. Finally, when the example has been completed, the operator depresses a FINISHED EXAMPLE display key (step 94) which returns the display 16 to step 80 which allows the operator to receive assistance on additional fixed keys 18 or exit the help mode (step 82).

Instead of opting to receive help (step 76), the operator can choose to edit the help file. After actuating the EDIT HELP FILE display key (step 78), the display 16 would prompt the operator to select a fixed key 18 from the mechanical keyboard 20 which needs its help information edited (step 96). At this point, the operator can simply select the EXIT HELP MODE display key (step 98) and return to the screen of the basic operating mode which was previously being viewed, or depress a fixed key 18 from the mechanical keyboard 20 (step 102). If the operator chooses step 102, then the display 16 asks the operator whether editing of the description of the depressed fixed key or the example associated with the depressed fixed key is required (step 104). The operator then chooses whether the description requires editing or the example requires editing.

Figures 8B, 8C:
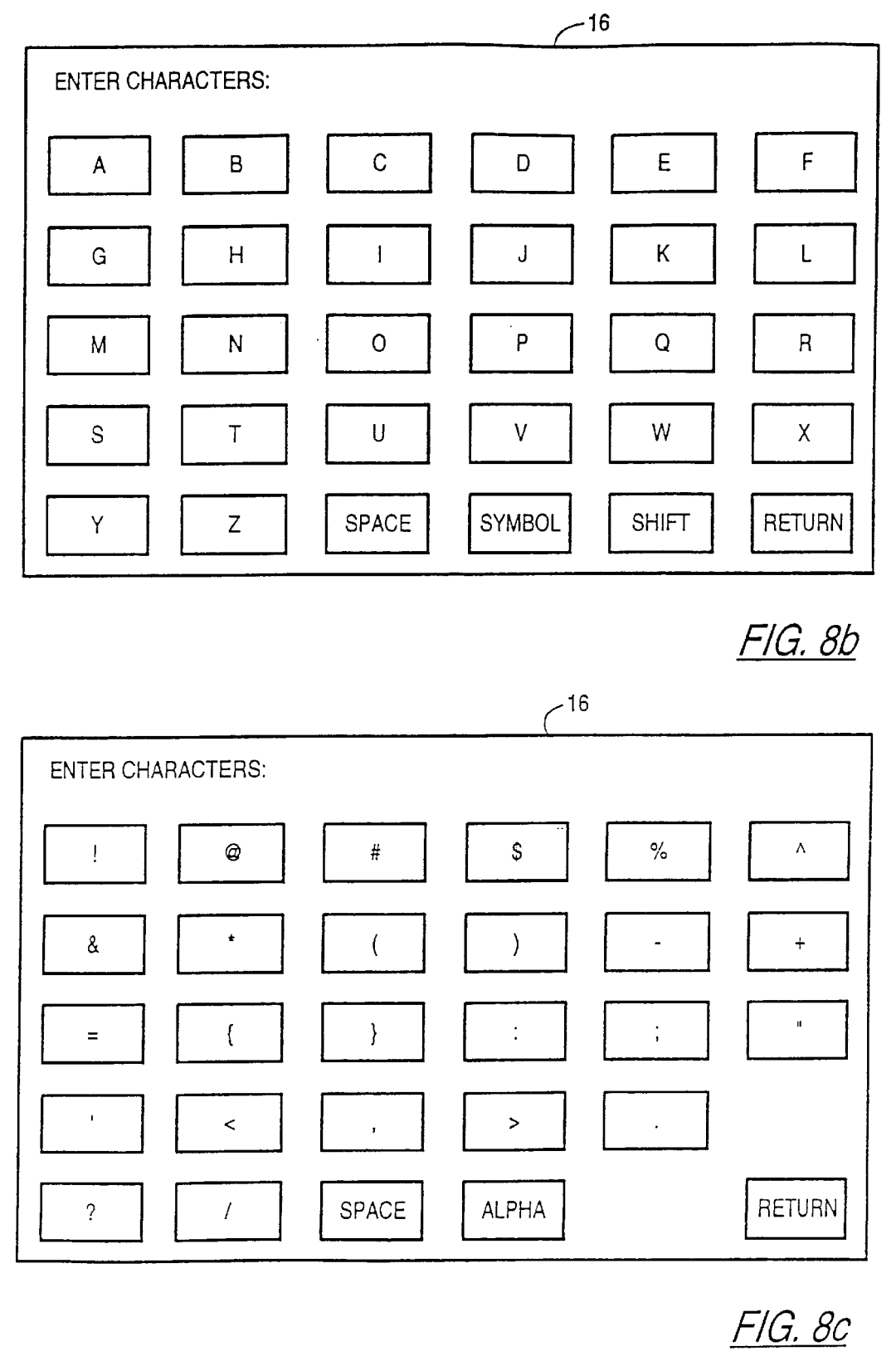

If the operator chooses the EDIT DESCRIPTION display key (step 106), then a screen similar to FIG. 7 is shown on the display 16 (step 110). The operator moves the cursor across the text to the point where editing is desired via the CURSOR ARROW display keys (step 112). The operator can then choose to delete the text by using a BACKSPACE display key at the location of the cursor (step 112). Alternatively, the operator can write over existing text with the TYPEOVER display key at the location of the cursor (step 112). Lastly, the operator can insert words with the INSERT display key at the location of the cursor (step 112). When the operator chooses to the INSERT or TYPEOVER display keys, the screen switches to a lower case alpha character screen as shown in FIG. 8a (step 114). The operator then uses the displayed alpha keys to enter words into the description illustrated at the top of the screen. If the operator desires upper case letters, then the operator simply depresses the SHIFT display key and the letters become upper case as illustrated in FIG. 8b. Alternatively, the operator can select the SYMBOL display key and a screen appears with symbols as shown in FIG. 8c. The operator can then return to the alpha character screens in FIGS. 8a and 8b by depressing the ALPHA display key shown in FIG. 8c. Also, the operator utilizes the numerical group 36 on the mechanical keyboard 20 for entering any numbers, if numbers are needed. Once editing using the display keys is complete, the operator selects the RETURN display key (step 116) and returns to the previous screen in FIG. 7 (step 112). Again, the operator can move the cursor to a location in the newly-edited description where additional editing is needed. Lastly, the operator selects the FINISHED EDIT display key (step 118) to return to step 96 which allows the operator to continue editing, or exit the help mode as shown in step 98 by pressing the EXIT HELP display key.

The operator can likewise edit the example for a given fixed key 18 by selecting the EDIT EXAMPLE display key (step 108). The graphics display 16 shows the example for the depressed fixed key 18 and allows the operator to edit the example (step 120) as also depicted by FIG. 7. Again, the operator uses the ARROW display keys to move the cursor to the position which requires editing (step 122). Then, the operator selects the INSERT, TYPEOVER, or BACK-SPACE display keys to edit the text of the example (step 122). Depressing the INSERT or TYPEOVER display keys causes FIG. 8a to appear on the screen (step 124) wherein the operator can further access the upper case letters in FIG. 8b or the symbols in FIG. 8c by depressing the SHIFT display key or SYMBOL display key respectively. Once editing is complete, the operator selects the RETURN display key (step 126) and returns to the previous screen in FIG. 7 (step 122). Again, the operator moves the cursor to a location where additional editing is needed or selects the FINISHED EDIT display key (step 128) and returns to step 96 wherein the help mode can be exited as shown in step 98. In addition to ALPHA and SYMBOL display keys, the display keys can also include numeral display keys as well although they are not shown in FIGS. 8a–8c.

The help mode can also be utilized to teach the operator basic information concerning operation and maintenance of the touch screen device 30. Likewise, it can be used to describe functions associated with the display keys of the touch screen 32.

Figure 9A:
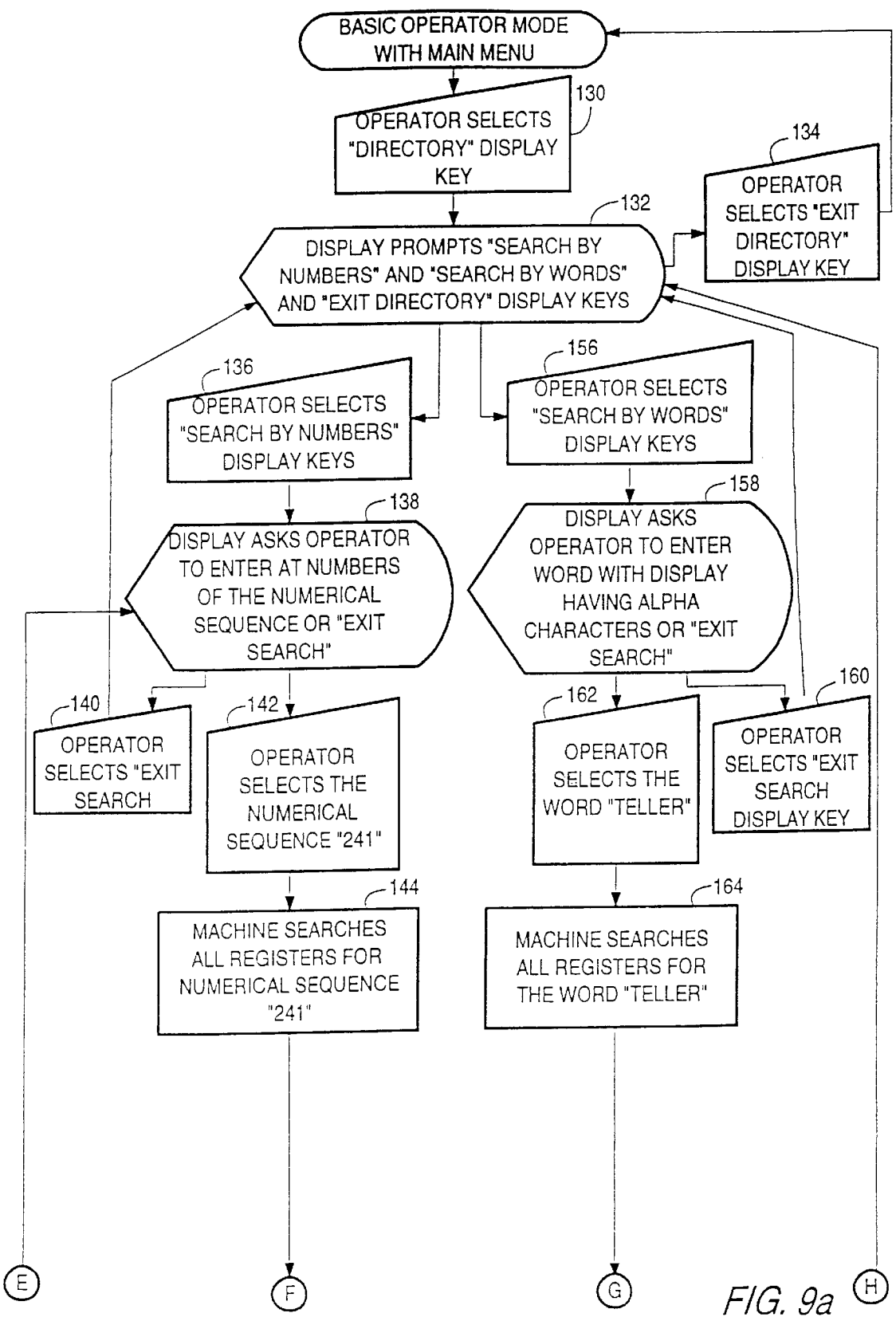
FIGS. 9a and 9b illustrate the flow diagram of the DIRECTORY mode.
Figure 9B:
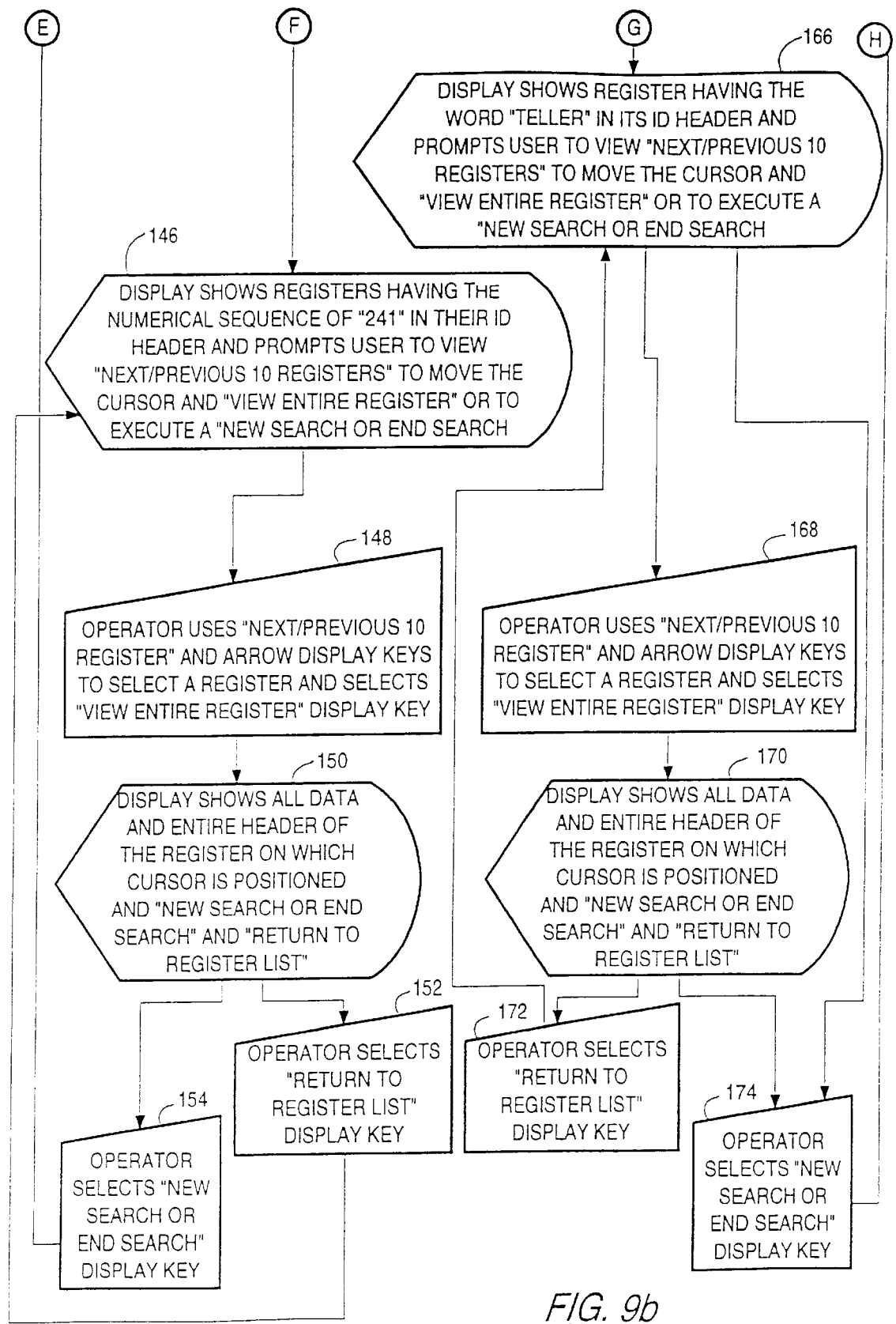

Referring now to FIGS. 9a and 9b, the flow diagram for the directory mode is illustrated. The directory mode allows the operator to quickly search all registers in the memory device 50 of FIG. 4 for desired alpha characters or numerical sequences. This is useful in that the operator may want to pull up all registers relating to a specific type of transaction or by a specific operator. Because the operator may not know the location of all registers containing the desired transactions, the operator enters alpha characters or a numerical sequence which is common throughout all of the desired transactions. The search may be useful for searching for a specific employee number, employee name, or account number. The controller 24 then searches the memory device 50 for all registers having a header identification corresponding to the operator-entered alpha characters or numerical sequence and displays these registers and their corresponding header identification on the display 16. However, the data within each register is not displayed. The operator then scrolls through the displayed registers containing the desired alpha characters or numerical sequence and selects a register whereby the data within that selected register is then displayed. Considering the numerous registers in the memory device 50, it would be quite difficult for an operator to recall which data is in which register and, therefore, this mode can be quite advantageous.

The operator working in the basic operating mode actuates the touch screen at a position above the DIRECTORY display key 54 (step 130) to enter the directory mode. The display 16 then asks the operator to select the method in which he or she would prefer to search, whether it be a search by words or by numerical sequence (step 132). Additionally, the operator may choose to exit the directory mode by selecting the EXIT DIRECTORY display key (step 134).

If the operator selects the SEARCH BY NUMBERS display key (step 136), then the display 16 prompts the user to enter a numerical sequence on which the controller 24 bases the search of the registers of the memory device 50 (step 138). Alternatively, the operator can select the EXIT SEARCH display key (step 140) and return to the main directory mode screen (step 132). The operator enters the desired numerical sequence via the numerical group 36 of FIG. 2 on the mechanical keyboard 20 (step 142). The controller 24 then searches all registers for the numerical sequence entered (step 144) and displays the first ten registers with their associated header lines containing the numerical sequence on the display 16 as in FIG. 10 (step 146). The numerical sequence "241" is used in FIGS. 9a, 9b and 10 as an example. The operator then chooses to view the next or previous ten registers having the desired numerical sequence by depressing the NEXT 10 REGISTERS display key or PREVIOUS 10 REGISTERS display key, respectively (step 148). Additionally, the operator can depress the CURSOR ARROW display keys to move the cursor to a particular register on the display 16 (step 148). After moving the cursor, the operator can select the VIEW REGISTER display key (step 148) to view the entire header and all data contained in the register on which the cursor is positioned as shown in FIG. 11 (step 150). The operator can then return to the listing of the registers with the desired numerical sequence by selecting the RETURN TO REGISTER LIST display key (step 152) which returns the operator to the screen illustrated in FIG. 10 (step 146). Alternatively, the operator can select the NEW SEARCH OR END SEARCH display key (step 154) and return to step 138.

If the operator selects the SEARCH BY WORD(S) display key (step 156), then the display 16 appears as in FIG. 12 and requires the user to enter a word or words on which the controller 24 bases the search of the registers of the memory device 50 (step 158). Alternatively, the operator can select the EXIT SEARCH display key (step 160) and return to the main directory mode screen (step 132). The operator enters the desired word via the ALPHA display keys on the touch screen (step 162) and the word is printed across the top of the screen as shown in FIG. 12. The controller 24 then searches all registers for the word entered (step 164) and displays the first ten registers with their associated header line containing the word on the display 16 as in FIG. 13 (step 166). The word "teller" is used in FIGS. 9a, 9b, 12 and 13 as an example. The operator then chooses to view the next or previous ten registers having the desired word by depressing the NEXT 10 REGISTERS display key or PREVIOUS 10 REGISTERS display key, respectively (step 168). Additionally, the operator can depress the CURSOR ARROW display keys to move the cursor to a particular register on the display 16 (step 168). After moving the cursor, the operator selects the VIEW ENTIRE REGISTER display key (step 168) to view the entire header and all data contained in the register on which the cursor is positioned on the display 16 (step 170) in a manner similar to that shown in FIG. 11. The operator then returns to the list of registers having the desired word by selecting the RETURN TO REGISTER LIST display key (step 172) which returns the operator to the screen shown in FIG. 13 (step 166). Alternatively, the operator selects the NEW SEARCH OR END SEARCH display key (step 174) and returns to step 138.

Figure 14A:
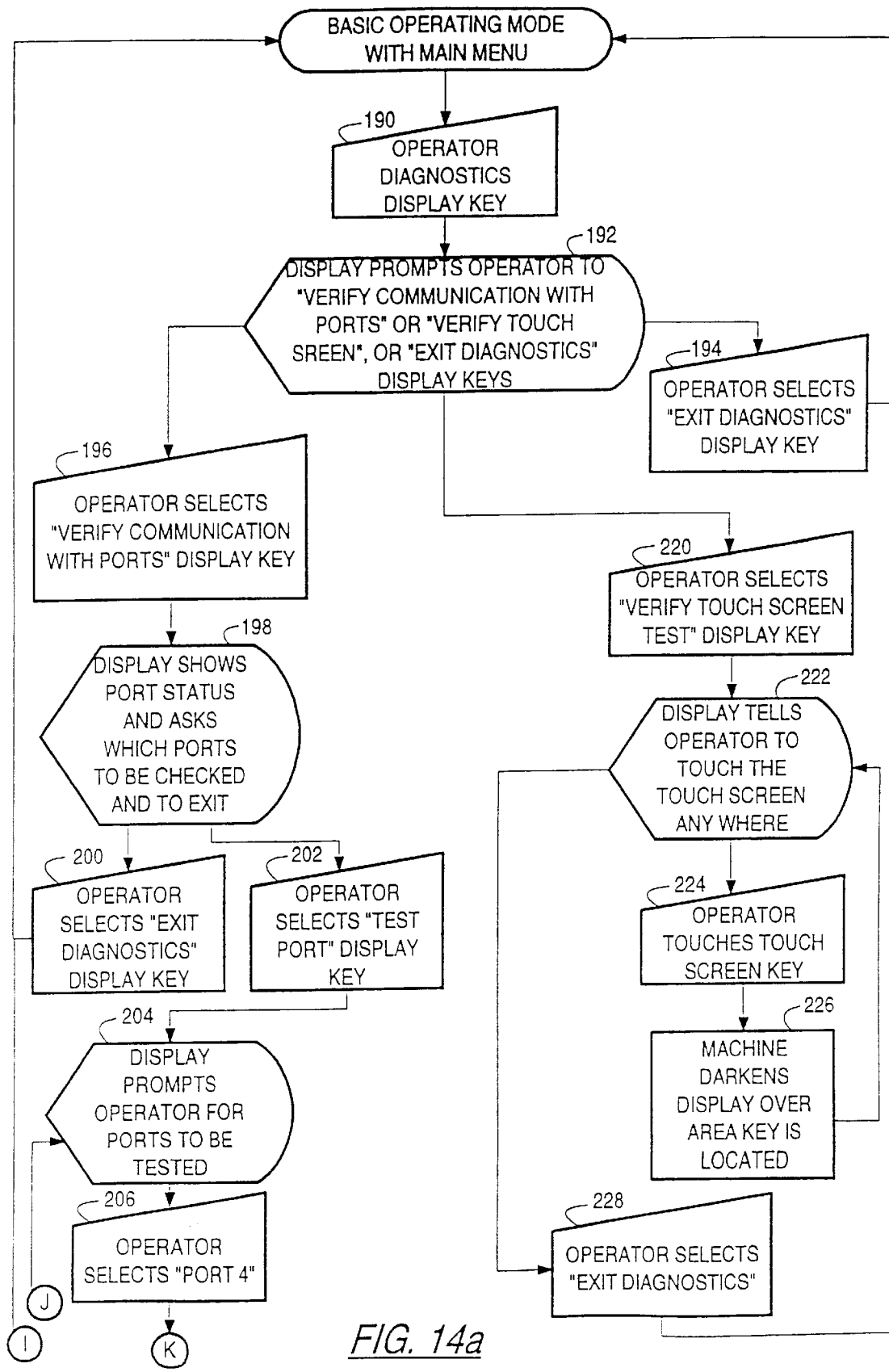
FIGS. 14a and 14b illustrate the flow diagram of the DIAGNOSTICS mode.
Figure 14B:
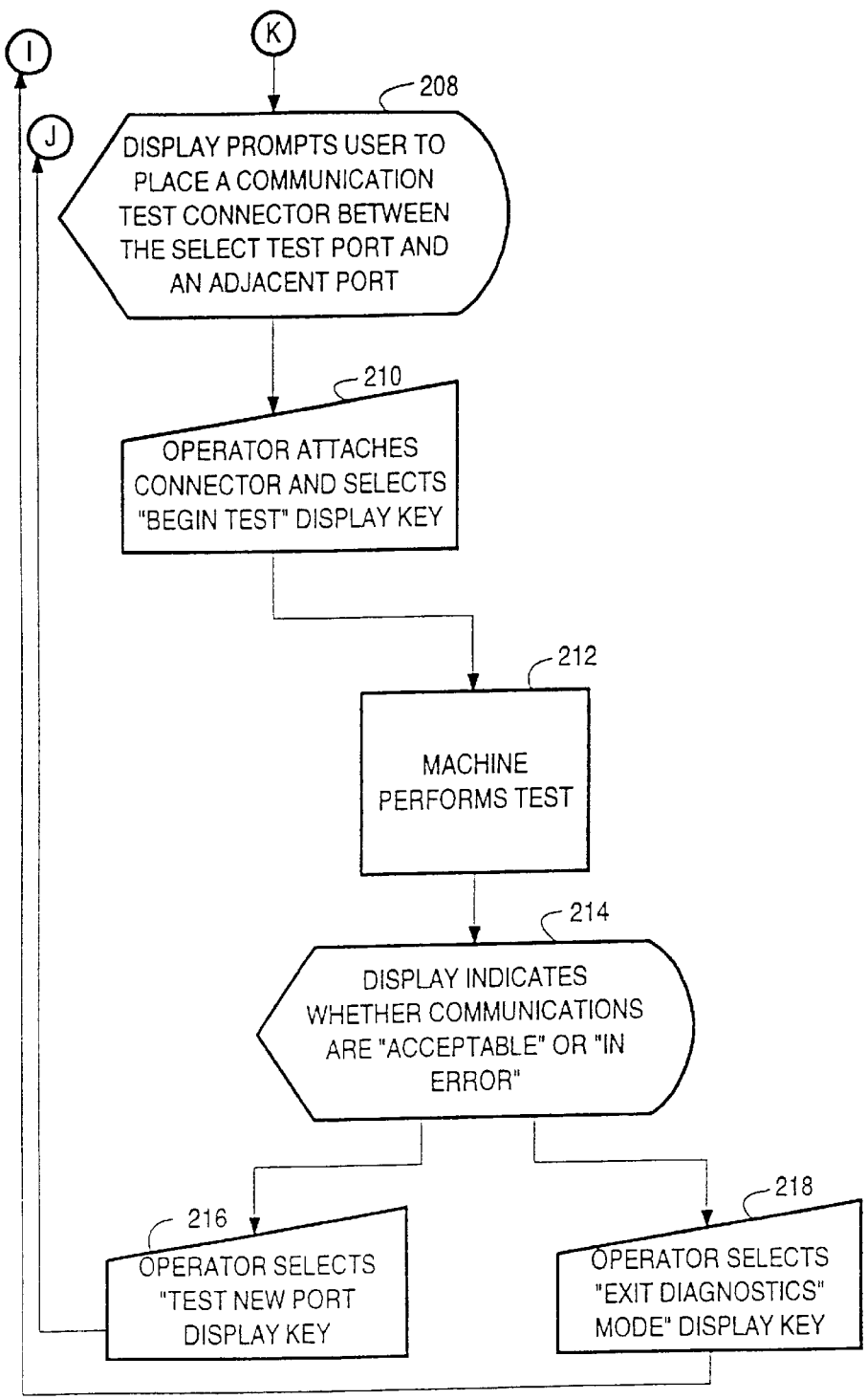

Referring now to FIGS. 14a and 14b, the operator, upon selecting the DIAGNOSTICS display key 52 from the basic operating mode, enters the diagnostics mode (step 190). The diagnostics mode allows the operator to verify the operability of the touch screen device 30 and the ports 29 (step 192). Once in the diagnostics mode, the operator exits the diagnostics mode by selecting the EXIT DIAGNOSTICS MODE display key (step 194).

If the operator chooses to test the ports by selecting the VERIFY COMMUNICATION WITH PORTS display key (step 196), then the display 16 shows the current status of the ports 29 and the peripheral devices to which they are coupled as shown in FIG. 15 (step 198). After viewing the status, the operator may choose to exit the diagnostics mode by selecting the EXIT DIAGNOSTICS MODE display key (step 200). Alternatively, the communication status of the ports can be verified by selecting the TEST PORT display key (step 202) which causes the display 16 to prompt the operator for the ports 29 which need to be tested (step 204). The operator then selects one of the ports 29 (step 206). The display 16 then instructs the operator to connect a communication test connector between the selected port 29 and a computer-selected adjacent port (step 208). The operator connects the communications test connector between these ports and selects a BEGIN TEST display key (step 210). The controller 24 then performs the test (step 212) and displays the results of the communications test on the display 16 as either "acceptable" or "in error" (step 214). The operator then can select the TEST NEW PORT display key (step 216) and return to step 204. Alternatively, the operator can select the EXIT DIAGNOSTICS MODE display key (step 218) and return to the screen in the basic operating mode which the operator was viewing prior to entering the diagnostics mode.

Alternatively, a more simplistic test can be employed wherein the operator uses a series of test connectors. Each connector is placed between two adjacent ports. The test is run and the operator is informed whether each port has properly responded to the test.

If the operator chooses to test the touch screen device 30 (step 220), the display 16 prompts the operator to select any portion of the touch screen 32 (step 222). The operator then actuates the touch screen 32 at any location (step 224). Upon actuation, the display 16 then shows the display keys capable for that specific touch screen 32 and graphics display 16, and darkens the display key which the controller 24 believes the operator is actuating (step 226). Once the operator stops actuating the touch screen 32, the display 16 returns to the screen described in step 222. The operator then tests another display key, or selects the EXIT DIAGNOSTICS MODE display key and returns to the basic operating mode (step 228).

Figure 16A:
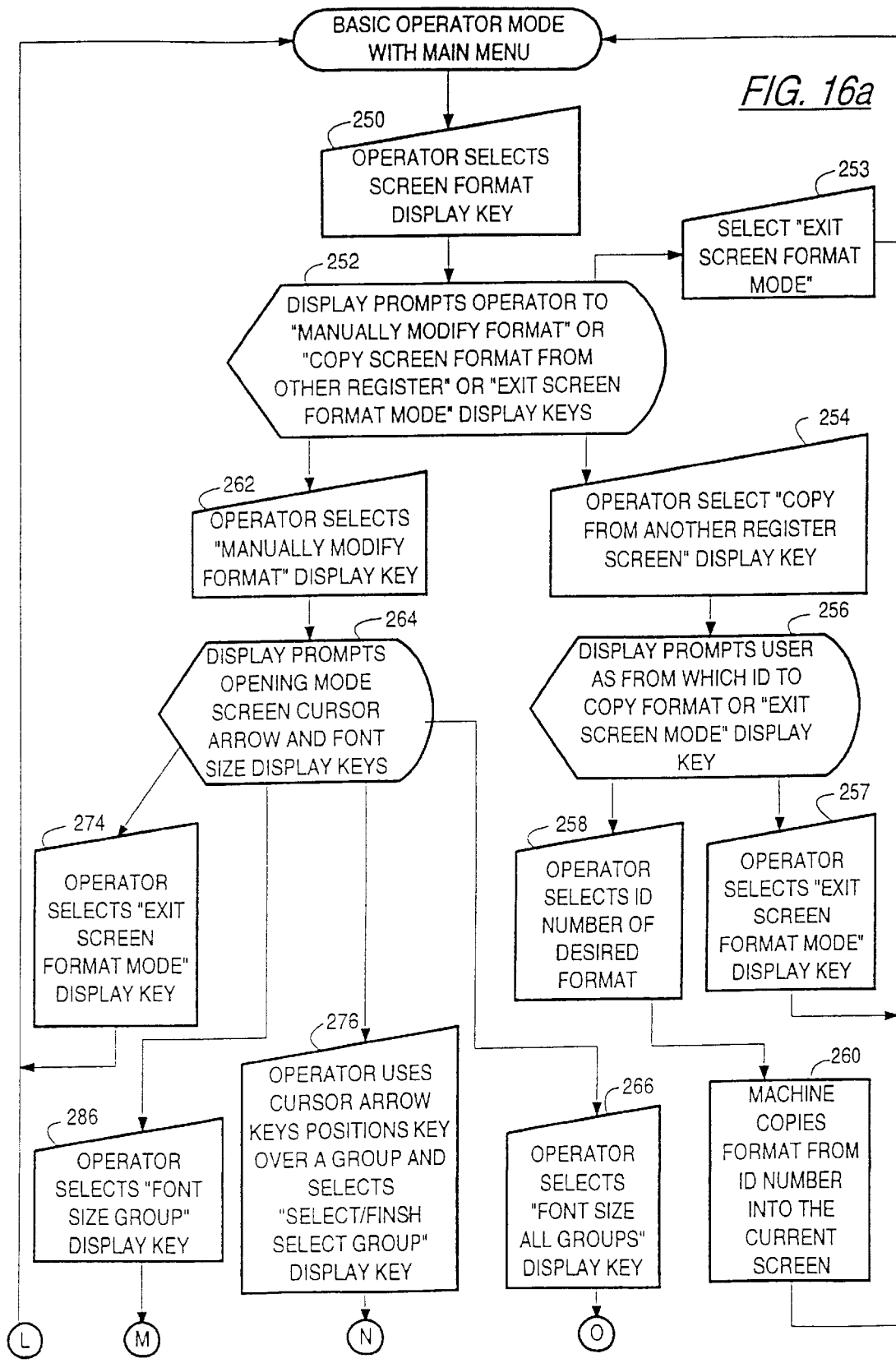
FIGS. 16a and 16b illustrate the flow diagram of the SCREEN FORMAT mode.
Figure 16B:
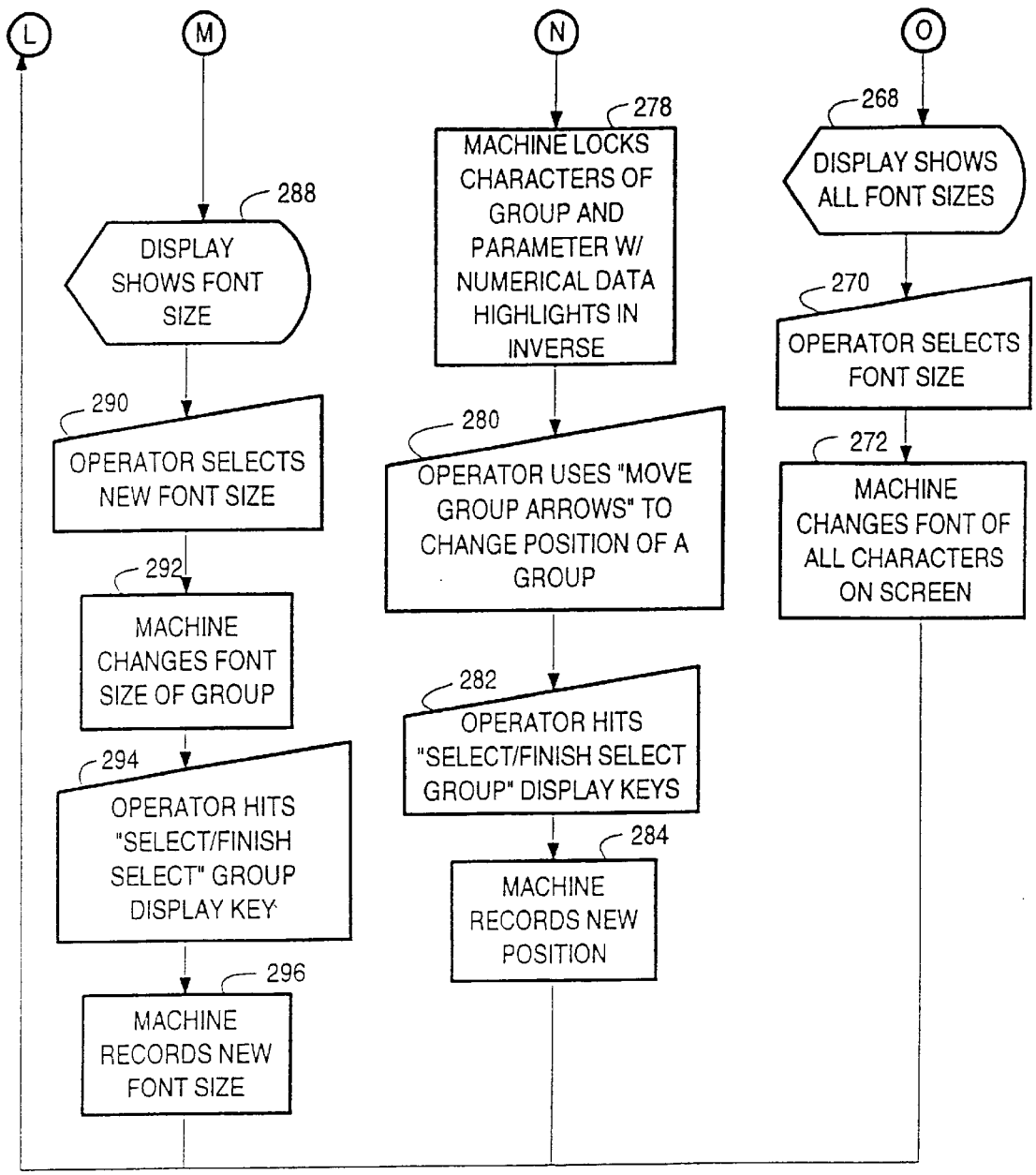

Referring now to FIGS. 16a and 16b, the operator has the ability to modify the manner in which graphics are displayed on the graphics display 16 in the basic operating mode. In the basic operating mode, the operator depresses the SCREEN FORMAT display key 56 (step 250) and the graphics display 16 prompts the operator whether the screen format is to be changed manually or by copying from another register (step 252). The operator can also exit the screen format mode by selecting the EXIT SCREEN FORMAT MODE display key (step 253).

If the operator selects the COPY FROM ANOTHER REGISTER display key (step 254), the display 16 prompts the operator for the ID of the register from which the format is to be copied (step 256). The operator may desire to return to the basic operating mode and select the EXIT SCREEN FORMAT mode display key (step 257). To copy a format, the operator enters the ID of the register in the memory device 50 which has the desirable format (step 258). The controller 24 copies the screen format from that particular register (step 260) and automatically returns to the basic operating mode which now illustrates the data on the graphics display 16 with the newly copied format. This method of modifying the format allows the operator to display numerous registers in a common format without manual modification of each register.

Figure 17:
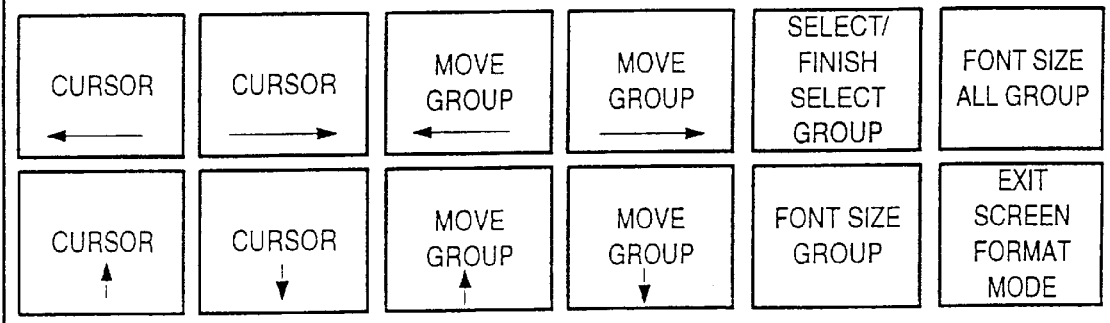
FIG. 17 is an illustration of the graphics display wherein the operator is modifying the character format in the SCREEN FORMAT mode.

If the operator chooses the MANUALLY MODIFY FORMAT display key (step 262), the display 16 shows the screen from the basic operating mode from which the operator entered the screen format mode as shown in FIG. 17 (step 264). If the operator selects the FONT SIZE ALL GROUPS (step 266), then the machine displays a list of fonts sizes available (step 268). The operator selects the display key with the desired font size (step 270) and the controller 24 changes the font of all characters on the screen (step 272) and returns to step 264 for additional editing or to exit the mode by selecting the EXIT SCREEN FORMAT MODE display button (step 274). The operator can move the cursor around the screen by the CURSOR ARROW display keys (step 276). The operator can select a group, whether the group is a data title such as "coins" or "cash", or numerical data by selecting the SELECT/FINISH SELECT GROUP display key which toggles between selecting a group and finishing the selection of the group. The selected group then appears in inverse color (dark on light) and the controller 24 locks onto the group (step 278). The operator uses the MOVE GROUP ARROWS to move the highlighted group across the display 16 to a new position (step 280). Upon locating the desirable new position, the operator again selects the SELECT/FINISH SELECT GROUP display key (step 282) and the controller 24 records the new group position and returns to step 264 (step 284).

Alternatively, the operator may select the FONT SIZE GROUP display key to change the font size of only the highlighted group (step 286). Again, the display 16 gives the operator alternative font sizes step 288) from which the operator chooses a new font size (step 290). The machine then changes the font size of the selected group (step 292) and the operator chooses the SELECT/FINISH SELECT GROUP display key (step 294) wherein the machine records the new font size of the group (step 296) and returns to step 264 for more editing. Additionally, different fonts could be used in addition to different font sizes for more versatility. This feature would depend on the ability of the graphics display 16 to display alternative type of fonts. Additionally, the screen format mode may allow the operator to modify the color of the graphics display 16, as well as the characters and display keys, if the graphics display 16 has color capability. This is accomplished in a algorithm similar to the font changing algorithm.

Figure 18A:
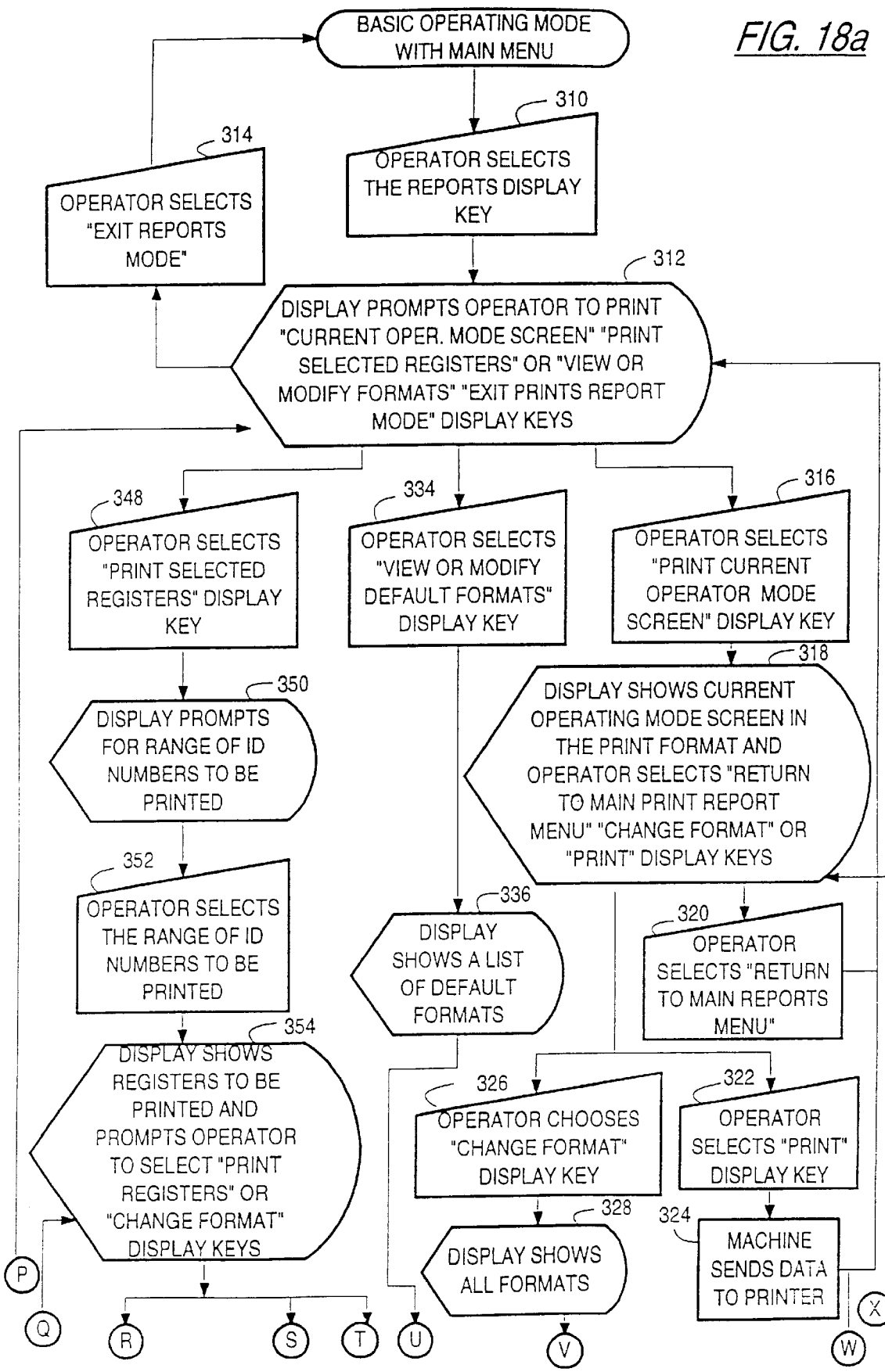
FIGS. 18a and 18b illustrate the flow diagram of the REPORTS mode.
Figure 18B:
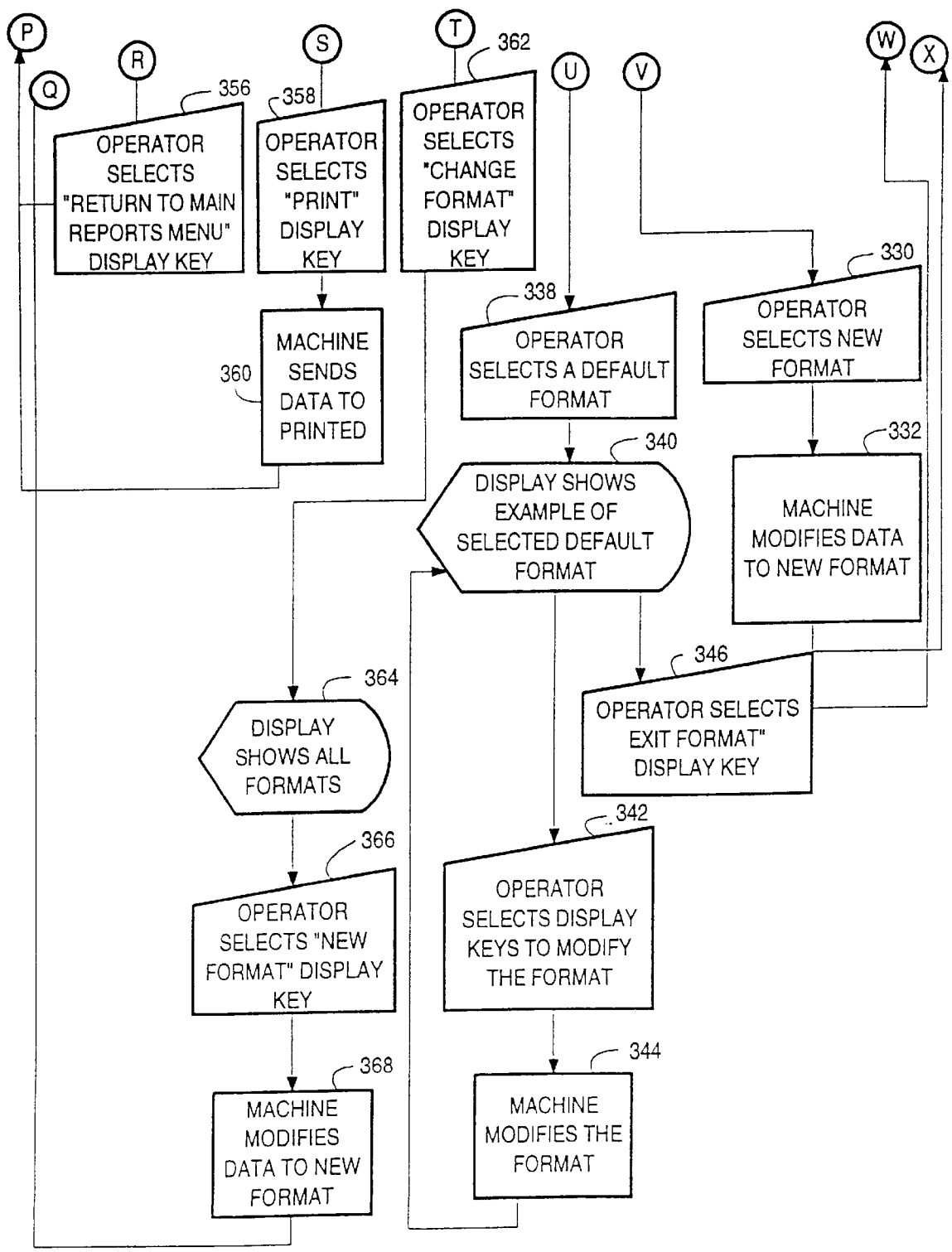

Referring now to FIGS. 18a and 18b, the flow diagram for the reports mode is illustrated. After selecting the REPORTS display key in the main menu from the basic operating mode (step 310), the operator may print a report of particular registers or the basic operating mode screen from which the operator just exited (step 312). Additionally, the display 16 allows the operator to browse through the variety of default print formats in the memory device 50 or modify a default format. Lastly, the operator can exit this mode by selecting the EXIT REPORTS MODE display key (step 314).

If the operator chooses to print the current operating mode screen from which the operator has exited, then the operator selects the PRINT CURRENT OPERATING MODE SCREEN display key (step 316). In step 318, the display 16 then shows the operating mode screen as it would be printed and prompts the operator to print the report, change the report format, or return to the main reports menu by depressing the RETURN TO MAIN REPORTS MENU display key (step 320).

If the operator selects to print the report by selecting the PRINT display key (322), then the controller 24 sends data to the printer peripheral device for printing (step 324) and the screen returns to the main reports screen in step 312.

If the operator selects the CHANGE FORMAT display key (step 326), then the display 16 lists all available formats as display keys from which the operator can select a new format for the screen to be printed (step 328). The operator can then select a new format (step 330) and the controller 24 incorporates screen data into the new format (step 332). The operator then returns to step 318 wherein the new format is is displayed and can be printed.

If the operator chooses to view or modify the formats by selecting the VIEW OR MODIFY FORMATS display key (step 334), then the display 16 would show a list of all formats as display keys (step 336). The operator then selects a format to be viewed or modified (step 338). The display 16 then shows the parameters which that particular format would print and the location on the page of where it would be printed as shown in FIG. 19 (step 340). The line numbers on the page are shown on the far left while the character location horizontally across the page is show at the top. The operator can then edit the format by using the display keys (step 342).

The operator can move up and down the page by use of the SCROLL UP/DOWN display keys. The operator can add a line or remove a line between vertically adjacent characters by use of the ADD LINE and REMOVE LINE display keys. The operator can add or remove spaces between horizontally adjacent characters by the ADD SPACE and REMOVE SPACE display keys. Most importantly, every title (e.g. "cash") and parameter (e.g. D1–D4) can be printed or deleted from the printed page by actuating the touch screen 32 over the title or parameter. If the box surrounding the title or parameter is non-shaded, the title or parameter will be printed. If the box is shaded, the parameter or title will not be printed in the report. For example, parameters "T4", "D4", "N4", "T5", "CT3", "CD3", and "CN3" which correspond to entries in a register of the memory device 50 will not be printed in the print report of FIG. 19. Nor will the title of "Total Cash" be printed either. The operator uses the SCROLL DOWN display key to see the remaining parameters and title that will be printed. After any editing, the controller 24 automatically records the edit (step 344). The operator returns to step 340 and can continue to further edit, or return to the main reports menu of step 312 by actuating the EXIT FORMATS display key (step 346). Alternatively, this type of report format initialization could exist under a set-up mode instead of under the reports mode.

If the operator chooses to print selected registers from the main reports menu (step 312) by selecting the PRINT SELECTED REGISTERS display key (step 348), then the display 16 asks the operator to enter the register IDs to be printed (step 350). The operator can select a range of register IDs by the numerical keypad group on the mechanical keyboard and by using the (–) THROUGH and (&) AND display keys (step 352). These display keys tell the CSM whether the reports of two adjacent ID registers should be made (i.e. 942 & 960) or reports of all registers between the selected ID registers should be made (i.e. 942–960). The display 16 then lists the selected registers and the formats for the print reports (step 354). The operator can choose to return to the main menu by selecting the RETURN TO MAIN REPORTS MENU display key (step 356). The operator can also select the PRINT display key (step 358) wherein the controller 24 sends the data to the printer (step 360) and the display 16 returns to the main reports menu at step 312. Alternatively, the operator can select the CHANGE FORMAT display key (step 362) wherein the display 16 shows all formats from which the operator may choose (step 364). The operator selects a new format (step 366) into which the controller 24 incorporates the data to be printed (step 368) and returns the operator to step 354 for printing with the new format.

The reports mode may include additional types of basic operational reports which the operator would select through the display keys in the report mode. A session report is a summary of the transactions encountered during that particular operator session. A daily report summarizes all sessions occurring within a particular day. A productivity report records the time required for the operator to reconcile transactions and determines the operator efficiency on the CSM 10. A register report allows the operator to print out all data base registers which the operator has initialized and labeled with a header and database ID number. A report of subtotals, totals, and grandtotals which are stored in predetermined registers can be obtained. A cash-in and cash-out report summarizing the net result of transactions wherein money is also dispensed can be acquired. All of these reports can be displayed as a list of display keys once the operator enters the report mode, although they have not been included in the flow diagram of FIGS. 18a and 18b.

Additionally, the reports could be formatted to send to a personal computer connected to one of the ports 29. Thus, large amounts of report information can be sent to database of a personal computer and processed for accounting purposes. The data could be formatted in ASCI or other related formats and transmitted via an established protocol.

Figure 20A:
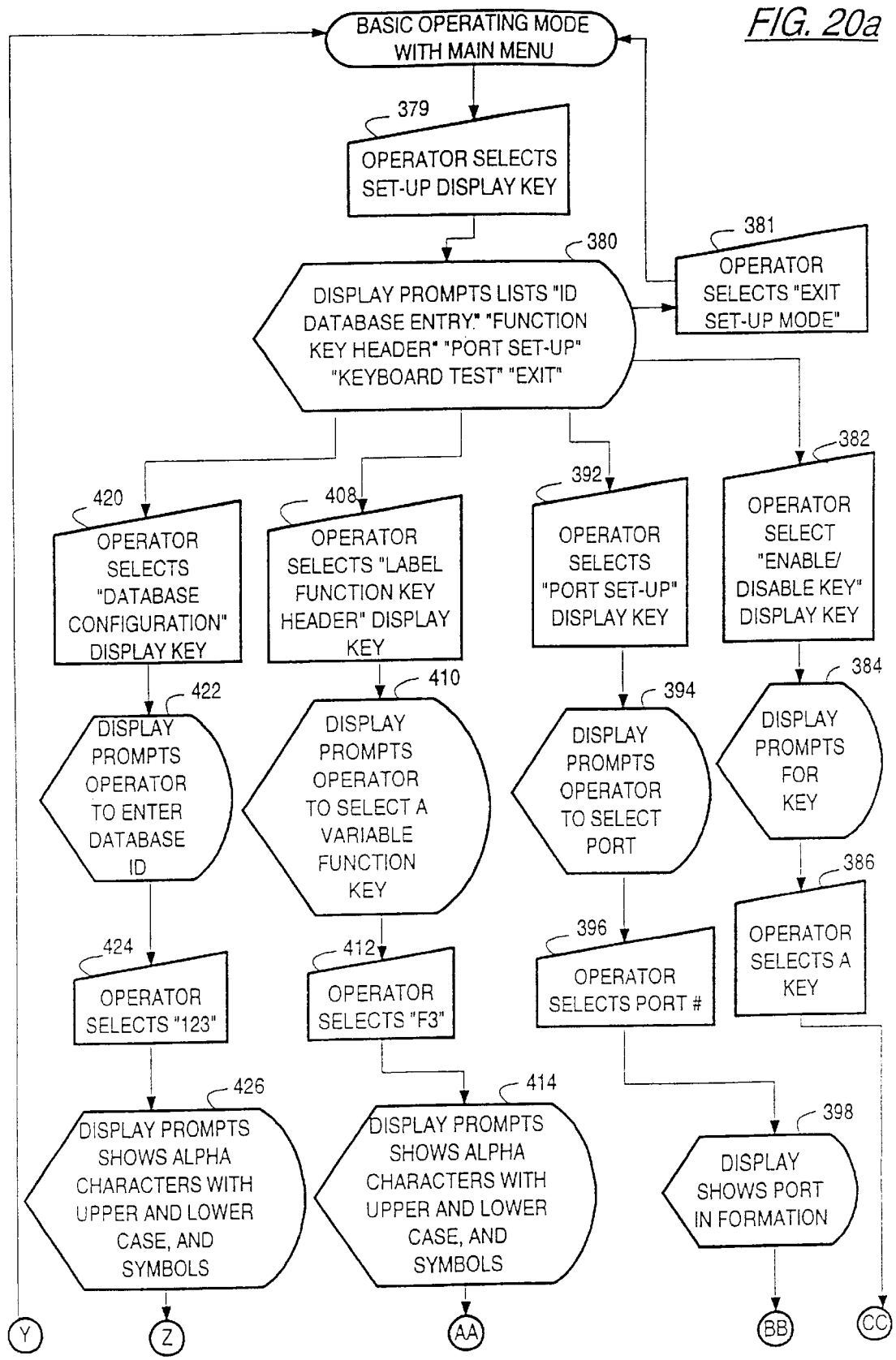
FIGS. 20a and 20b illustrate the flow diagram of the SET-UP mode.
Figure 20B:
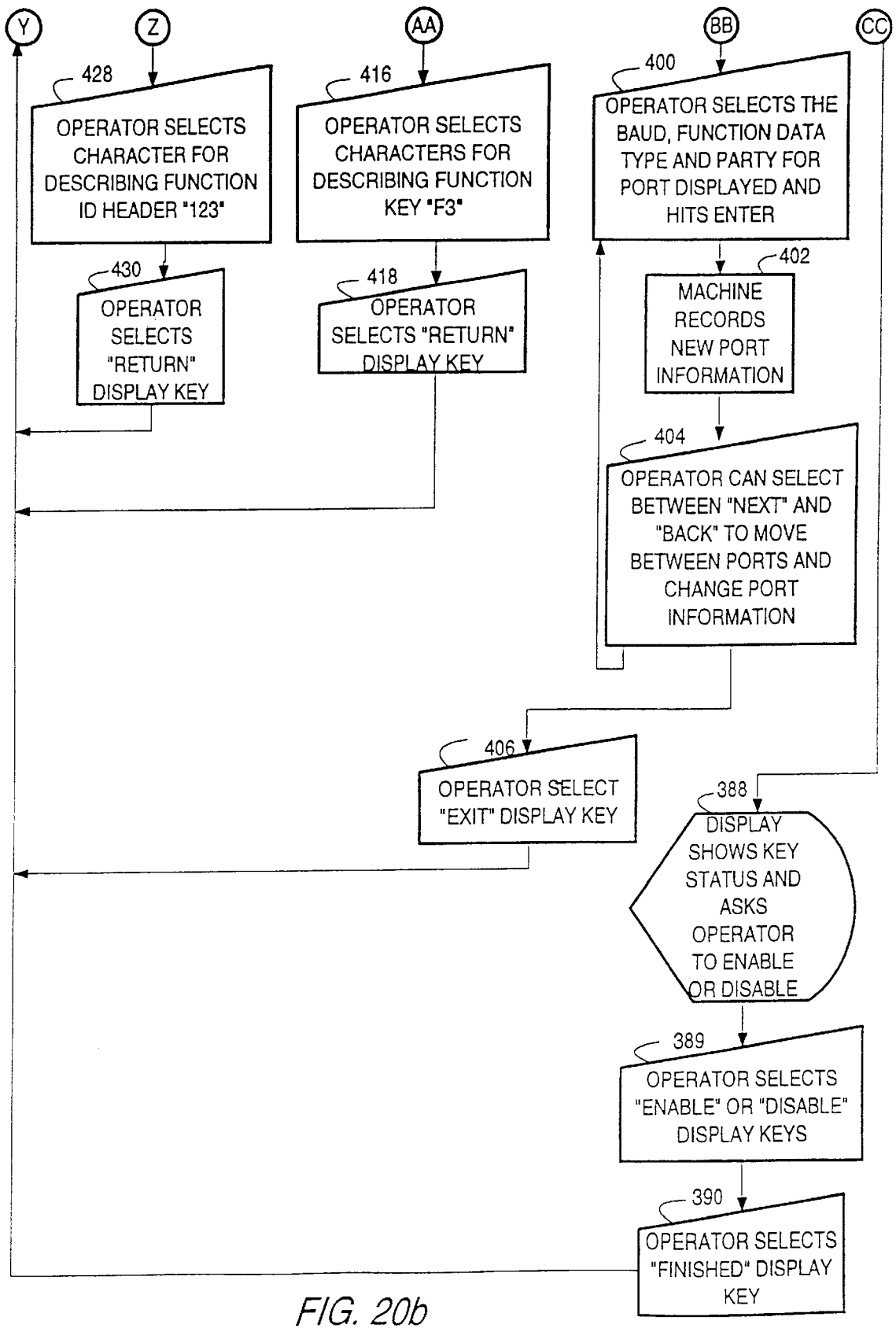

Referring now to FIGS. 20a and 20b, the operator has the ability to enter a set-up mode which allows for the initialization and labeling of functions, registers, and ports. Upon actuating the SET-UP display key 60 in the basic operating mode (step 379), the display 16 prompts the operator to enter the set-up option which the operator desires (step 380). To exit the set-up mode, the operator selects the EXIT SET-UP MODE display key (step 381).

If the operator chooses the ENABLE/DISABLE FUNCTION display key (step 382), the display 16 prompts the operator to enter a fixed key 18 from the mechanical keyboard 20 which the operator desires to be disabled or enabled (step 384). The operator then selects the fixed key 18 from the mechanical keyboard 20 (step 386), and the display 16 shows the fixed key selected, displays the current status of the fixed key 18, and asks the operator whether to maintain the current status or change the status (step 388). The operator then selects an ENABLE or DISABLE display key to change the status of that fixed key 18 (step 389). When the operator is finished, the operator selects a FINISHED display key (step 390) and returns to step 380. The enable and disable function can also be configured to disable or enable the display keys on the touch screen 32 in a manner similar to that described above for the fixed keys 18.

The operator can also select a PORT SET-UP display key from the main set-up menu (step 392) and the display 16 prompts the operator to enter the port number of the ports 29 to be initialized (step 394). The operator then selects the port number from the PORT NUMBER display keys on the touch screen 32 (step 396). The display 16 then shows the status of the port selected with those parameters of the port highlighted with a shaded display key as depicted in FIG. 21 (step 398). The operator can then select different parameters relating to the port function, baud rate, data, and parity (step 400) by selecting other display keys which are then automatically recorded by the controller 24 (step 402). The operator then uses the NEXT and PREVIOUS display keys to scroll through the various ports and review their current status, and make changes if necessary. When finished, the operator then chooses the EXIT display key and returns to the main menu of the set-up mode (step 406).

The operator can also label the header of keys from the variable function key group 35 on the mechanical keyboard 20. Upon selecting the LABEL FUNCTION KEY HEADER display key (step 408), the operator is prompted to select a variable function key 35 from the mechanical keyboard 20 (step 410). The operator selects a key, such as "F3" (step 412), and the graphics display 16 shows alpha characters similar to those shown in FIGS. 8a–8c except the line at the top of the screen reads "Enter Header for F3:" (step 414). The operator then selects the characters for the F3 key header (step 416). The operator selects the RETURN display key after labeling is complete (step 418) and returns to the main menu of the set-up mode in step 380. Although not depicted in the set-up mode flow diagram, the operator could also use the set-up mode to label display keys on the graphics display 16. Thus, customization of the touch screen device 30 can be readily obtained.

The operator can also configure the database for the registers of the memory device 50. Upon selecting the DATABASE CONFIGURATION display key (step 420), the operator is prompted to select a database ID label (step 422). The controller 24 then searches the memory device 50 for an available register which will now be labeled with the database ID. The operator selects an ID label, such as "123" (step 424), and the graphics display 16 shows alpha characters similar to those shown in FIGS. 8a–8c except the line at the top of the screen reads "Enter Header for ID# 123" (step 426). The operator then selects the characters for the ID header (step 428). Lastly, the operator selects the RETURN display key when complete (step 430) and returns to the main set-up menu in step 380.

Although only a function related to the labeling of the registers is shown, numerous other functions could be accomplished by use of the touch screen 32 after selecting the DATABASE CONFIGURATION display key. For example, the operator can establish the number of lines of the database ID label that should be displayed in the basic operational mode. An internal clock of the CSM 10 can be set or changed. A till fund value which establishes the initial balance of a particular register can be input such that it is offset against a declared balance when the transaction associated with that register are later recorded for reconciliation. Numerous additional functions could also be accomplished.

The set-up mode can be used to provide basic information to the CSM 10 concerning data to be input through peripheral devices via the ports 29. For example, the manner in which data is to be input, either manually or automatically through peripheral devices, can be established. And more detailed information on the automated data entry can be programmed. For example, the number of paper bills which the paper counter 42 will count in one counting increment can be input into the CSM 10 so that the CSM 10 understands the value of the data transmitted from the paper counter 42. Numerous other initializations related to the peripheral devices can also be accomplished easily through the use of the touch screen device 30.

The modes which have been described in detail have included various functions within them. It would be simple to combine all of these functions into fewer "modes." Alternatively, it would be simple to expand the number of modes by giving each function herein described its own "mode." This fact is the essence of the touch screen device 30 in that it provides substantial flexibility.

In another embodiment, the CSM 10 uses only the touch screen 32 for the operator interface panel. The mechanical keyboard 20 is completely removed and all mechanical keys are now displayed as display keys on the graphics display 16. As with the mechanical keyboard 20, the display keys which are most commonly used are ergonomically grouped together on the graphics display 16. These grouped keys are arranged about the edges of the graphics display such that the middle of the display 16 can be devoted to display of the financial data, as shown in FIG. 22. Any labeling of the variable function keys (F1–F6) can now be shown on the display keys and whether the display key is disabled. Also, the monetary group keys can be highlighted by shading the value of the monetary data that is to be entered by the operator, which in FIG. 22, is dollars. The display 16 also includes a FOREIGN CURRENCY display key which allows the operator to choose a variety of foreign currencies which will be recorded and reconciled. After selecting the appropriate currency, the monetary group display keys change to denominations and symbols associated with the selected foreign currency and the CSM 10 recognizes any inputs to be in the newly selected foreign currency. To return to the basic U.S. currency, the operator again selects the FOREIGN CURRENCY display key and selects a U.S. currency display key. Additionally, the selection of the foreign currency after actuating the FOREIGN CURRENCY display key could be through the operator touching the touch screen on a country of a world map displayed on the graphics display 16 which is then highlighted. Also, the exchange rate and other financial parameters could be input through the attached peripheral devices.

In conjunction with the touch screen device 30, the controller 24 can create numerous patterns of the display keys on the display 16. The touch screen device 30 and controller 24 permit a virtually unlimited number of display keys to be shown on the display 16. The number of display keys is constrained primarily by the capacity of the memory device 50 in the controller 24 and the touch screen 32 output signal resolution. Selection of the display pattern could be achieved within the set-up mode. Such a large number of keys would occupy an inordinate amount of space if formed as part of a mechanical keyboard.

In yet another alternative embodiment, the controller 24 and touch screen device 30 are used to customize data entry fields, edit key legends, display key legends and other textual information in different languages, disable or enable display keys shown on the display 16, and reposition selected display keys displayed on the display 16. In addition, the controller 24 and touch screen device 30 may be employed to modify the complexity of the display patterns on the display 16 to match the level of experience of the operator. For example, a novice may prefer a large number of relatively simple display patterns while a more experienced operator may prefer a small number of relatively complex display patterns.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A cash settlement machine for recording and reconciling financial data, comprising:

a graphics display for displaying information to be viewed by an operator of said cash settlement machine, said information including portions of said financial data;

operator interface panels including a mechanical keyboard having fixed keys and a touch screen mounted over said graphics display for providing input signals in response to manual actuation of said fixed keys and said touch screen, said input signals including a plurality of mode-entry signals for commanding said cash settlement machine to operate in a plurality of operational modes, each of said plurality of mode-entry signals corresponding to a respective one of said plurality of operational modes;

a controller coupled to said operator interface panels and to said graphics display, said controller for manipulating said data, said controller including a graphics generator for generating said information on said graphics display, said information further including display keys, each of said display keys positioned on said graphics display at a key display location, each of said input signals from said touch screen corresponding to manual actuation of said touch screen above a respective one of said key display locations, memory for storing instructions for each of said plurality of operational modes, and means for executing said instructions, said executing means executing said instructions for one of said operational modes upon receipt of said corresponding mode entry signal, said instructions including display key instructions wherein said executing means instructs said graphics generator to generate said display keys at said display key locations and wherein one of said plurality of operational modes includes a help mode for displaying operational information concerning said cash settlement machine on said graphics display and said mode-entry signals include a help mode-entry signal, said executing means executing said instructions corresponding to said help mode upon receipt of said help mode-entry signal, said display key instructions instructing said graphics generator to venerate a set of help mode display keys upon receipt of said help mode-entry signal, said set of help mode display keys including help editing display keys for editing said operational information, and said help editing display keys including alpha character display keys.

2. The cash settlement machine of claim 1, further including ports electronically communicating with said controller, and wherein peripheral devices are electronically connected to said ports.

3. A cash settlement station of claim 2, wherein one of said plurality of peripheral devices is a coin sorting machine.

4. A cash settlement station of claim 2, wherein one of said plurality of peripheral devices is a cash scanning and counting machine.

5. A cash settlement station of claim 2, wherein one of said plurality of peripheral devices dispenses money.

6. The cash settlement machine of claim 1, wherein said input signals include a plurality of function signals commanding said cash settlement machine to perform a plurality of functions for processing said data, each of said function signals corresponding to a respective one of said plurality of functions, and wherein said instructions include function instructions, said executing means executing said function instructions to perform said functions upon receipt of said corresponding function signal.

7. The cash settlement machine of claim 1, wherein one of said plurality of operational modes includes a basic operational mode for recording and reconciling said financial data, and wherein said generating means generating display keys corresponding to other ones of said plurality of operational modes on said graphics display.

8. The cash settlement machine of claim 1, wherein said set of help mode display keys includes help information display keys for displaying information on said fixed keys of said mechanical keyboard and help example display keys for displaying examples utilizing said fixed keys of said mechanical keyboard.

9. The cash settlement machine of claim 1, wherein one of said plurality of operational modes includes a diagnostic mode for displaying diagnostic information concerning said cash settlement machine on said graphics display and said mode-entry signals include a diagnostic mode-entry signal said executing means executing said instructions corresponding to said diagnostic mode upon receipt of said diagnostic mode-entry signal, said display key instructions instructing said graphics generator to generate a set of diagnostic mode display keys upon receipt of said diagnostic mode-entry signal.

10. The cash settlement machine of claim 9, wherein said set of diagnostics mode display keys include touch screen test display keys for verifying the operability of said touch screen.

11. The cash settlement machine of claim 1, wherein one of said plurality of operational modes includes a screen format mode for modifying the manner in which said data is displayed on said graphics display and said mode-entry signals include a screen format mode-entry signal, said executing means executing said instructions corresponding to said screen format mode upon receipt of said screen format mode-entry signal, said display key instructions instructing said graphics generator to generate a set of screen format mode display keys upon receipt of said screen format mode-entry signal.

12. The cash settlement machine of claim 11, wherein said set of screen format mode display keys includes character moving display keys for moving operator selected data displayed on said graphics display.

13. The cash settlement machine of claim 11, wherein said set of screen format mode display keys includes font display keys for modifying fonts and font sizes of said data displayed on said graphics display.

14. The cash settlement machine of claim 1, wherein one of said plurality of operational modes includes a set-up mode for initializing said cash settlement machine and said mode-entry signals include a set-up mode-entry signal said executing means executing said instructions corresponding to said set-up mode upon receipt of said set-up mode-entry signal, said display key instructions instructing said graphics generator to generate a set of set-up mode display keys upon receipt of said set-up mode-entry signal.

15. The cash settlement machine of claim 1, wherein each one of said mode-entry signals is provided by said touch screen.

16. The cash settlement machine of claim 1, wherein each of said plurality of operational modes is accessible by said user at any time.

17. A cash settlement machine for recording and reconciling financial data, comprising:

a graphics display for displaying information to be viewed by an operator of said cash settlement machine, said information including portions of said financial data;

an operator interface panel including a touch screen mounted over said graphics display for providing input signals in response to manual actuation of said touch screen, said input signals including a plurality of mode-entry signals for commanding said cash settlement machine to operate in a plurality of operational modes, each of said plurality of mode-entry signals corresponding to a respective one of said plurality of operational modes; and a controller coupled to said operator interface panel and to said graphics display, said controller for manipulating said data and including a graphics generator for generating said information on said graphics display, said information including display keys, each of said display keys positioned on said graphics display at a key display location, each of said input signals from said touch screen corresponding to manual actuation of said touch screen above a respective one of said key display locations, memory for storing instructions for each of said plurality of operational modes, and means for executing said instructions, said executing means executing instructions for one of said operational modes upon receipt of said corresponding mode-entry entry signal, said instructions including display key instructions wherein said executing means instructs said graphics generator to generate said display keys at said display key locations and a port electronically communicating with said controller, said port adapted for connection to a peripheral device that downloads and periodically updates a foreign exchange rate, said foreign exchange rate being used by said cash settlement machine to convert from a primary currency to a secondary currency.

18. The cash settlement machine of claim 17, wherein said display keys includes a foreign currency display key, said input signal from said foreign currency display key instructing said executing means to convert input data from said primary currency to said secondary currency, said input data being modified by a factor corresponding to said foreign exchange rate.

19. A method for operating a cash settlement machine having a graphics display for displaying said data;

a touch screen mounted over said graphics display for providing input signals in response to manual actuation of said touch screen; and a controller coupled to said touch screen and to said graphics display, said controller including a graphics generator for generating display keys on said graphics display, each of said display keys positioned on said graphics display at a key display location, each of said input signals from said touch screen corresponding to manual actuation of said touch screen above a respective one of said key display locations, memory for storing instructions for each of a plurality of operational modes including a basic operating mode for said cash settlement machine, a help mode for providing the operator with information about said cash settlement machine, a diagnostic mode for checking the status of components of said cash settlement machine, a directory mode for searching registers in said memory device, a set-up mode for configuring said cash settlement machine to a desired preference of the operator, a screen format mode for varying the information displayed on said graphics display, and a reports mode for reviewing the format of reports from said cash settlement machine, and means for executing said instructions including display key instructions wherein said executing means instructs said graphics generator to generate said display keys at said display key locations, the method comprising the steps of:

displaying, under direction of said controller, said display keys on said graphics display associated with one of said plurality of operational modes;

actuating said touch screen at a position above one of said key display locations; and executing, under direction of said controller, instructions corresponding to said display key above which said touch screen was actuated.

20. A cash settlement machine for recording and reconciling financial data, comprising:

a graphics display for displaying said data;

operator interface panels including a mechanical keyboard having fixed keys and a touch screen mounted over said graphics display for providing input signals in response to manual actuation of said fixed keys and said touch screen, said input signals including a plurality of mode-entry signals for commanding said cash settlement machine to operate in a plurality of operational modes, each of said plurality of mode-entry signals corresponding to a respective one of said plurality of operational modes;

a controller coupling said operator interface panels to said graphics display, said controller including a graphics generator for generating display keys on said graphics display, each of said display keys positioned on said graphics display at a key display location, each of said input signals from said touch screen corresponding to manual actuation of said touch screen above a respective one of said key display locations, memory for storing instructions for each of said plurality of operational modes, and means for executing said instructions, said executing means executing said instructions for one of said operational modes upon receipt of said corresponding mode-entry signal, said instructions including display key instructions wherein said executing means instructs said graphics generator to generate said display keys at said display key locations;

a port electronically communicating with said controller, said port being electronically connected to a personal computer; and wherein one of said plurality of operational modes includes a reports mode for downloading said data from said cash settlement machine to said personal computer and said mode-entry signals include a reports mode-entry signal, said executing means executing said instructions corresponding to said reports mode upon receipt of said reports mode-entry signal, said display key instructions instructing said graphics generator to generate a set of reports mode display keys upon receipt of said reports mode-entry signal.

21. The cash settlement machine of claim 20, further including a second port electronically communicating with said controller and a printer electronically connected to said second port, said reports mode further allows for printing said data from said cash settlement machine to said printer.

22. The cash settlement machine of claim 21, wherein said instructions corresponding to said reports mode include pre-defined print formats, said set of reports mode display keys includes format display keys allowing said operator to choose a format of said data being sent to said printer from said pre-defined print formats.

23. The cash settlement machine of claim 22, wherein said set of reports mode display keys includes editing display keys for enabling an operator to edit said pre-defined print formats, said editing display keys including character movement display keys for moving said data in said pre-defined print formats on said graphics display.

24. The cash settlement machine of claim 20, wherein said set of reports mode display keys includes keys allowing for the selection of a format of said data.

25. The cash settlement machine of claim 20, wherein said reports mode-entry signal is provided by manual actuation of said touch screen.

26. A cash settlement machine for recording and reconciling financial data, comprising:

a graphics display for displaying said data;

operator interface panels including a mechanical keyboard having fixed keys and a touch screen mounted over said graphics display for providing input signals in response to manual actuation of said fixed keys and said touch screen, said input signals including a plurality of mode-entry signals for commanding said cash settlement machine to operate in a plurality of operational modes, each of said plurality of mode-entry signals corresponding to a respective one of said plurality of operational modes;

a controller coupling said operator interface panels to said graphics display, said controller including a graphics generator for generating display keys on said graphics display, each of said display keys positioned on said graphics display at a key display location, each of said input signals from said touch screen corresponding to manual actuation of said touch screen above a respective one of said key display locations, memory for storing instructions for each of said plurality of operational modes, said memory including a plurality of registers for storing said data, and means for executing said instructions, said executing means executing said instructions for one of said operational modes upon receipt of said corresponding mode-entry signal, said instructions including display key instructions wherein said executing means instructs said graphics generator to generate said display keys at said display key locations; and wherein one of said plurality of operational modes includes a set-up mode for initializing said cash settlement machine and said mode-entry signals include a set-up mode-entry signal, said executing means executing said instructions corresponding to said set-up mode upon receipt of said set-up mode-entry signal, said display key instructions instructing said graphics generator to generate a set of set-up mode display keys upon receipt of said set-up mode-entry signal, and wherein said set of set-up mode display keys includes labeling display keys for labeling said registers of said memory, said labeling display keys including alpha character display keys.

27. The cash settlement machine of claim 26, wherein said fixed keys of said mechanical keyboard include variable function keys, said set of set-up mode display keys further includes labeling display keys for labeling said variable function keys, said labeling display keys including alpha character display keys.

28. The cash settlement machine of claim 26, wherein said display keys have variable function display keys, said set of set-up mode display keys further includes labeling display keys for labeling said variable function display keys, said labeling display keys including alpha character display keys.

29. The cash settlement machine of claim 26, wherein said set of set-up mode display keys further includes enable and disable display keys, said enable display key activating said input signal from an operator-selected fixed key, said disable display key deactivating said input signal from an operator-selected fixed key.

30. The cash settlement machine of claim 26, wherein said set of set-up mode display keys further includes enable and disable display keys, said enable display key activating said input signal from an operator-selected display key, said disable display key deactivating said input signal from an operator-selected display key.

31. The cash settlement machine of claim 26, wherein said labeling display keys further include numeric and symbol character display keys.

32. The cash settlement machine of claim 26, wherein said set-up mode-entry signal is provided by manual actuation of said touch screen.

33. A cash settlement machine for recording and reconciling financial data, comprising:

a graphics display for displaying said data;

operator interface panels including a mechanical keyboard having fixed keys and a touch screen mounted over said graphics display for providing input signals in response to manual actuation of said fixed keys and said touch screen, said input signals including a plurality of mode-entry signals for commanding said cash settlement machine to operate in a plurality of operational modes, each of said plurality of mode-entry signals corresponding to a respective one of said plurality of operational modes;

a controller coupling said operator interface panels to said graphics display, said controller including a graphics generator for generating display keys on said graphics display, each of said display keys positioned on said graphics display at a key display location, each of said input signals from said touch screen corresponding to manual actuation of said touch screen above a respective one of said key display locations, memory for storing instructions for each of said plurality of operational modes, and means for executing said instructions, said executing means executing said instructions for one of said operational modes upon receipt of said corresponding mode-entry signal, said instructions including display key instructions wherein said executing means instructs said graphics generator to generate said display keys at said display key locations;

ports electronically communicating with said controller, said ports electronically connected to peripheral devices; and wherein one of said plurality of operational modes includes a set-up mode for initializing said cash settlement machine and said mode-entry signals include a set-up mode-entry signal, said executing means executing said instructions corresponding to said set-up mode upon receipt of said set-up mode-entry signal, said display key instructions instructing said graphics generator to generate a set of set-up mode display keys upon receipt of said set-up mode-entry signal, said set of set-up mode display keys includes port set-up display keys to establish communication links of said peripheral devices to said cash settlement machine.

34. The cash settlement machine of claim 33, wherein said set-up mode-entry signal is provided by manual actuation of said touch screen.

35. The cash settlement machine of claim 33, wherein said port set-up display keys include display keys allowing for the selection of the type of said peripheral devices electronically connected to said ports.

36. The cash settlement machine of claim 33, wherein said port set-up display keys include display keys allowing for the selection of the characteristics of data communicated through said ports.

37. The cash settlement machine of claim 33, wherein said port set-up display keys include keys allowing for the selection of a rate at which data is communicated through said ports.

38. A cash settlement machine for recording and reconciling financial data, comprising:

a graphics display for displaying said data;

operator interface panels including a mechanical keyboard having fixed keys and a touch screen mounted over said graphics display for providing input signals in response to manual actuation of said fixed keys and said touch screen, said input signals including a plurality of mode-entry signals for commanding said cash settlement machine to operate in a plurality of operational modes, each of said plurality of mode-entry signals corresponding to a respective one of said plurality of operational modes;

a controller coupling said operator interface panels to said graphics display, said controller including a graphics generator for generating display keys on said graphics display, each of said display keys positioned on said graphics display at a key display location, each of said input signals from said touch screen corresponding to manual actuation of said touch screen above a respective one of said key display locations, memory for storing instructions for each of said plurality of operational modes, and means for executing said instructions, said executing means executing said instructions for one of said operational modes upon receipt of said corresponding mode-entry signal, said instructions including display key instructions wherein said executing means instructs said graphics generator to generate said display keys at said display key locations;

a plurality of ports electronically communicating with said controller, said ports adapted for connection to peripheral devices; and wherein one of said plurality of operational modes is a diagnostic mode for displaying diagnostic information concerning said cash settlement machine on said graphics display and said mode-entry signals include a diagnostic mode-entry signal, said executing means executing said instructions corresponding to said diagnostic mode upon receipt of said diagnostic mode-entry signal, said display key instructions instructing said graphics generator to generate a set of diagnostic mode display keys upon receipt of said diagnostic mode-entry signal, said set of diagnostic mode display keys including port test display keys for testing the operability of said plurality of ports.

39. The cash settlement machine of claim 38, wherein said diagnostic mode-entry signal is provided by manual actuation of said touch screen.

40. A cash settlement machine for recording and reconciling financial data, comprising:

a graphics display for displaying said data;

operator interface panels including a mechanical keyboard having fixed keys and a touch screen mounted over said graphics display for providing input signals in response to manual actuation of said fixed keys and said touch screen, said input signals including a plurality of mode-entry signals for commanding said cash settlement machine to operate in a plurality of operational modes, each of said plurality of mode-entry signals corresponding to a respective one of said plurality of operational modes;

a controller coupling said operator interface panels to said graphics display, said controller including a graphics generator for generating display keys on said graphics display, each of said display keys positioned on said graphics display at a key display location, each of said input signals from said touch screen corresponding to manual actuation of said touch screen above a respective one of said key display locations, memory for storing instructions for each of said plurality of operational modes, said memory including a plurality of registers for storing said data, and means for executing said instructions, said executing means executing said instructions for one of said operational modes upon receipt of said corresponding mode-entry signal, said instructions including display key instructions wherein said executing means instructs said graphics generator to generate said display keys at said display key locations; and wherein one of said plurality of operational modes is a directory mode for searching headings of said plurality of registers of said memory and said mode-entry signals include a directory mode-entry signal, said executing means executing said instructions corresponding to said directory mode upon receipt of said directory mode-entry signal, said display key instructions instructing said graphics generator to generate a set of directory mode display keys upon receipt of said directory mode-entry signal, said set of directory mode display keys including at least one of the display key groups consisting of (i) alpha display keys for selecting alpha characters to be searched in said plurality of registers and (ii) numerical display keys for selecting numerical characters to be searched in said plurality of registers.

41. The cash settlement machine of claim 40, wherein said directory mode-entry signal is provided by manual actuation of said touch screen.

\* \* \* \* \*

UNITED STATES PATENT AND TRADEMARK OFFICE
CERTIFICATE OF CORRECTION

PATENT NO.   : 5,943,655
DATED        : August 24, 1999
INVENTOR(S)  : Douglas R. Jacobson It is certified that errors appear in the above-identified patent and that said Letters Patent is hereby corrected as shown below:

In claim 1, column 17, line 45, delete "venerate" and insert --generate-- therefor.

Signed and Sealed this

Twentieth Day of February, 2001

Attest:

NICHOLAS P. GODICI

Attesting Officer

Acting Director of the United States Patent and Trademark Office